US011253776B2

(12) United States Patent
Enokido et al.

(10) Patent No.: US 11,253,776 B2
(45) Date of Patent: Feb. 22, 2022

(54) COMPUTER DEVICE AND EVALUATION CONTROL METHOD

(71) Applicant: BANDAI NAMCO Entertainment Inc., Tokyo (JP)

(72) Inventors: Naoki Enokido, Matsudo (JP); Masayuki Shimizu, Yokohama (JP)

(73) Assignee: BANDAI NAMCO Entertainment Inc., Tokyo (JP)

( * ) Notice: Subject to any disclaimer, the term of this patent is extended or adjusted under 35 U.S.C. 154(b) by 0 days.

(21) Appl. No.: 16/911,567

(22) Filed: Jun. 25, 2020

(65) Prior Publication Data

US 2020/0324194 A1 Oct. 15, 2020

Related U.S. Application Data

(63) Continuation of application No. PCT/JP2018/043834, filed on Nov. 28, 2018.

(30) Foreign Application Priority Data

Dec. 28, 2017 (JP) .............................. JP2017-254824

(51) Int. Cl.
*A63F 13/211* (2014.01)
*A63F 13/22* (2014.01)
(Continued)

(52) U.S. Cl.
CPC ............ *A63F 13/211* (2014.09); *A63F 13/22* (2014.09); *A63F 13/24* (2014.09); *A63F 13/44* (2014.09); *A63F 2300/105* (2013.01)

(58) Field of Classification Search
CPC ............................................... A63F 2300/105
See application file for complete search history.

(56) References Cited

U.S. PATENT DOCUMENTS 10,543,423 B2 * 1/2020 Koizumi ................... G06F 3/02
2001/0015123 A1 * 8/2001 Nishitani ........... A63B 71/0686
84/615

(Continued)

FOREIGN PATENT DOCUMENTS

JP 2005-103240 A 4/2005
JP 2007-260105 A 10/2007

(Continued)

OTHER PUBLICATIONS

International Search Report of the International Searching Authority dated Mar. 5, 2019 for the corresponding International application No. PCT/JP2018/043834 (and English translation).

(Continued)

*Primary Examiner* — Omkar A Deodhar
*Assistant Examiner* — Shauna-Kay Hall
(74) *Attorney, Agent, or Firm* — Posz Law Group, PLC

(57) ABSTRACT

A computer device determines operation inputs one by one when a reference operation requesting successive inputs is presented. The computer device recognizes an inheritance condition is satisfied when a change in acceleration measured by an inertial sensor of a game controller appears at successive vertical movement of the controller. When recognizing that the inheritance condition is satisfied, the computer device can reduce a process load by limiting operation input determination to determination based on a change in acceleration. In addition, when recognizing that the inheritance condition is satisfied, the computer device can further reduce a process load by simplifying the process of type discrimination of the operation input through inheritance of the previous discrimination result.

20 Claims, 20 Drawing Sheets

(51) Int. Cl.
*A63F 13/24* (2014.01)
*A63F 13/44* (2014.01)

(56) References Cited

U.S. PATENT DOCUMENTS

| | | |
|---|---|---|
| 2003/0216179 A1 | 11/2003 | Suzuki et al. |
| 2005/0085297 A1 | 4/2005 | Onoda et al. |
| 2005/0096132 A1* | 5/2005 | Ueshima ............... A63F 13/533 463/37 |
| 2005/0213476 A1 | 9/2005 | Choi et al. |
| 2007/0197290 A1* | 8/2007 | Ueshima ............. A63F 13/5375 463/36 |
| 2007/0255434 A1 | 11/2007 | Inagaki |
| 2007/0256546 A1 | 11/2007 | Hikino et al. |
| 2007/0265104 A1 | 11/2007 | Haga et al. |
| 2007/0270217 A1 | 11/2007 | Rabin |
| 2007/0270219 A1* | 11/2007 | Sugioka ................ G06F 3/0346 463/37 |
| 2008/0039200 A1 | 2/2008 | Yoshida |
| 2008/0133798 A1* | 6/2008 | Park ........................ H04L 69/22 710/54 |
| 2009/0069096 A1* | 3/2009 | Nishimoto ............ A63F 13/814 463/43 |
| 2009/0318227 A1 | 12/2009 | Nakajima |
| 2010/0151948 A1* | 6/2010 | Vance ..................... A63F 13/10 463/43 |
| 2012/0135810 A1* | 5/2012 | Ohsawa .................. A63F 13/42 463/43 |
| 2012/0302347 A1* | 11/2012 | Nicholson ............... A63F 13/24 463/37 |
| 2013/0228062 A1* | 9/2013 | Tabata ................. G10H 1/0008 84/602 |
| 2013/0239780 A1* | 9/2013 | Tabata ................. G10H 1/0008 84/602 |
| 2013/0239785 A1* | 9/2013 | Tabata ................. G10H 1/0008 84/609 |
| 2017/0348592 A1* | 12/2017 | Tanaka .................. A63F 13/211 |
| 2020/0324195 A1 | 10/2020 | Enokido et al. |

FOREIGN PATENT DOCUMENTS

| | | |
|---|---|---|
| JP | 2007-267776 A | 10/2007 |
| JP | 2007-293191 A | 11/2007 |
| JP | 2008-036167 A | 2/2008 |
| JP | 2009-247557 A | 10/2009 |
| JP | 2009-536765 A | 10/2009 |
| JP | 2010-000257 A | 1/2010 |
| JP | 2016-010646 A | 1/2016 |

OTHER PUBLICATIONS

"Survival Kids Wii Official Guide", 1st edition, Konami Digital Entertainment Co ,Ltd., Sep. 17, 2008, pp. 6, 114-115.
Geekdays, [online], Feb. 16, 2017, [retrieval date Feb. 8, 2019], Internet: URL:https://geekdays.jp/2017/02/photokatsu-android-settings/, non-official translation ("Smartphone-exclusive music games, Summary of settings etc. made to play 'Photo Katsu' on Android").
Office Action dated Jun. 25, 2021 in U.S. Appl. No. 16/911,570.

* cited by examiner

FIG.2
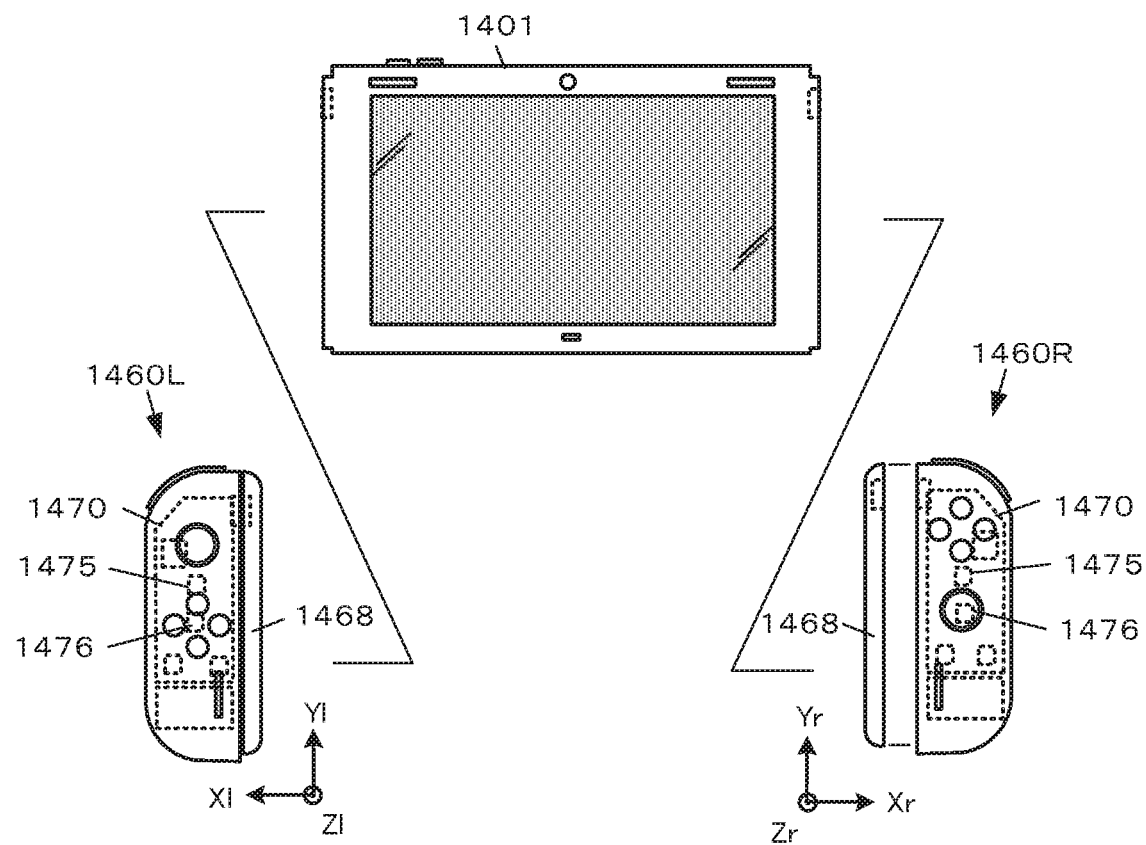
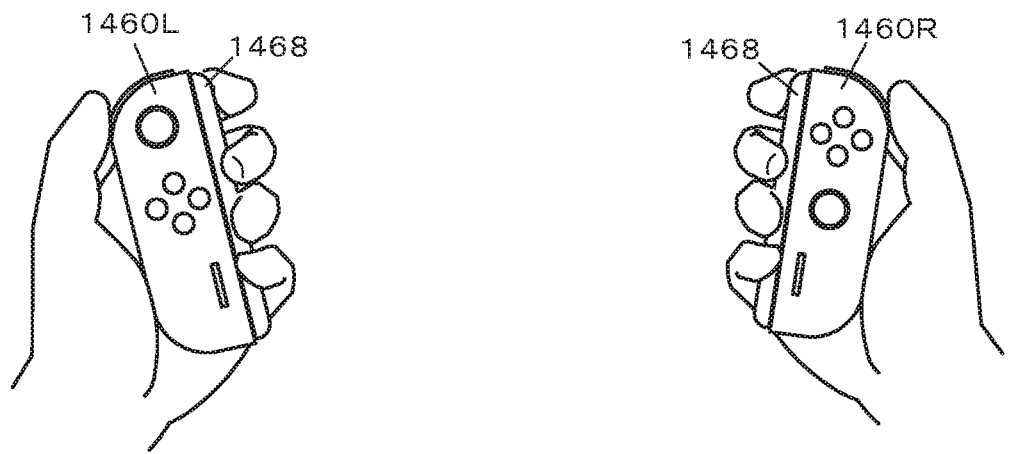

FIG.3
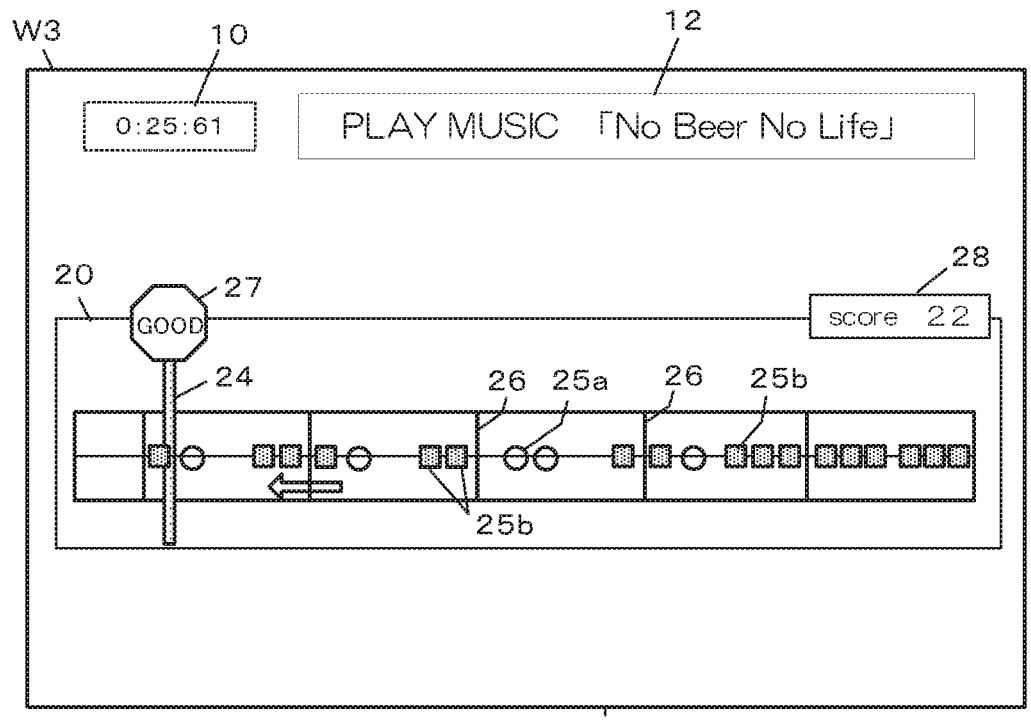
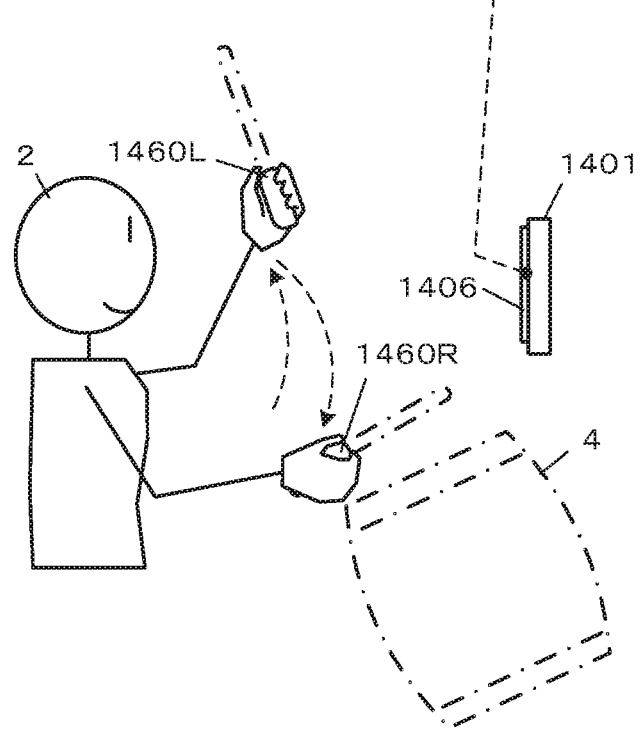

FIG.7
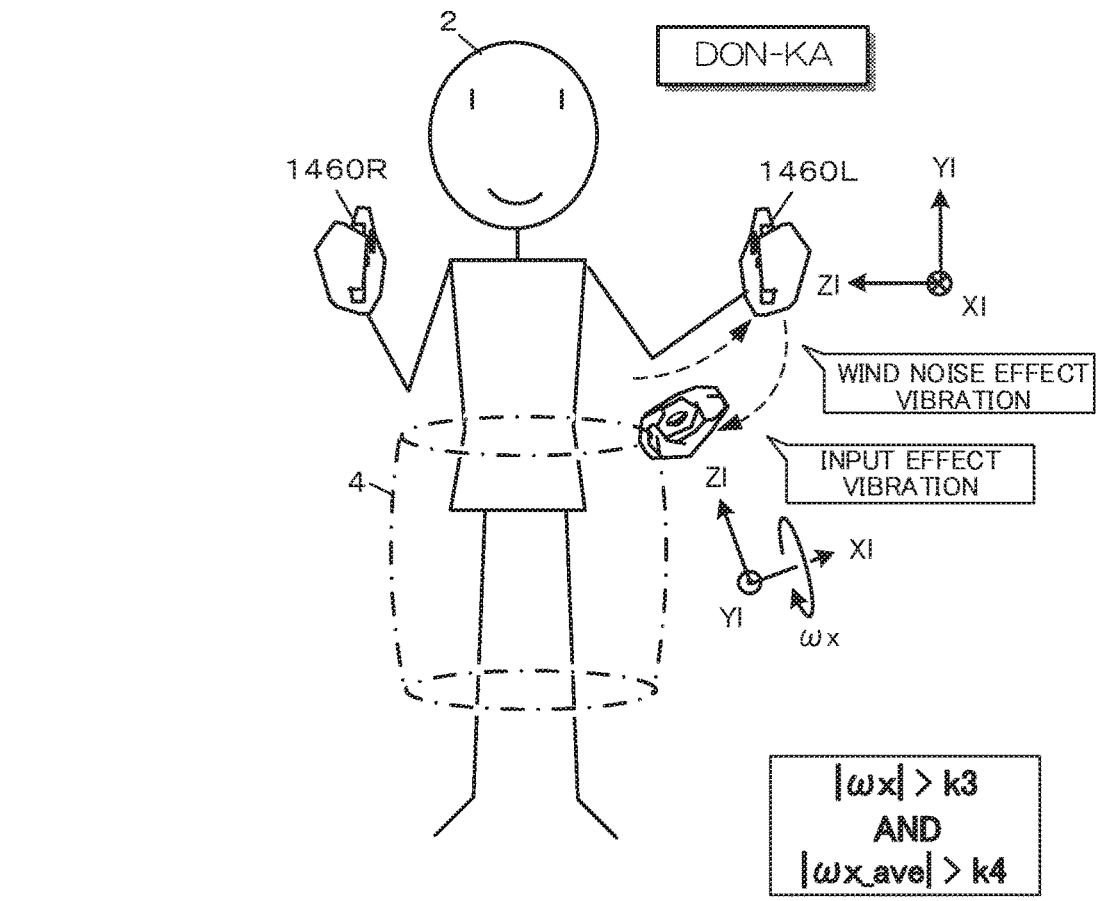
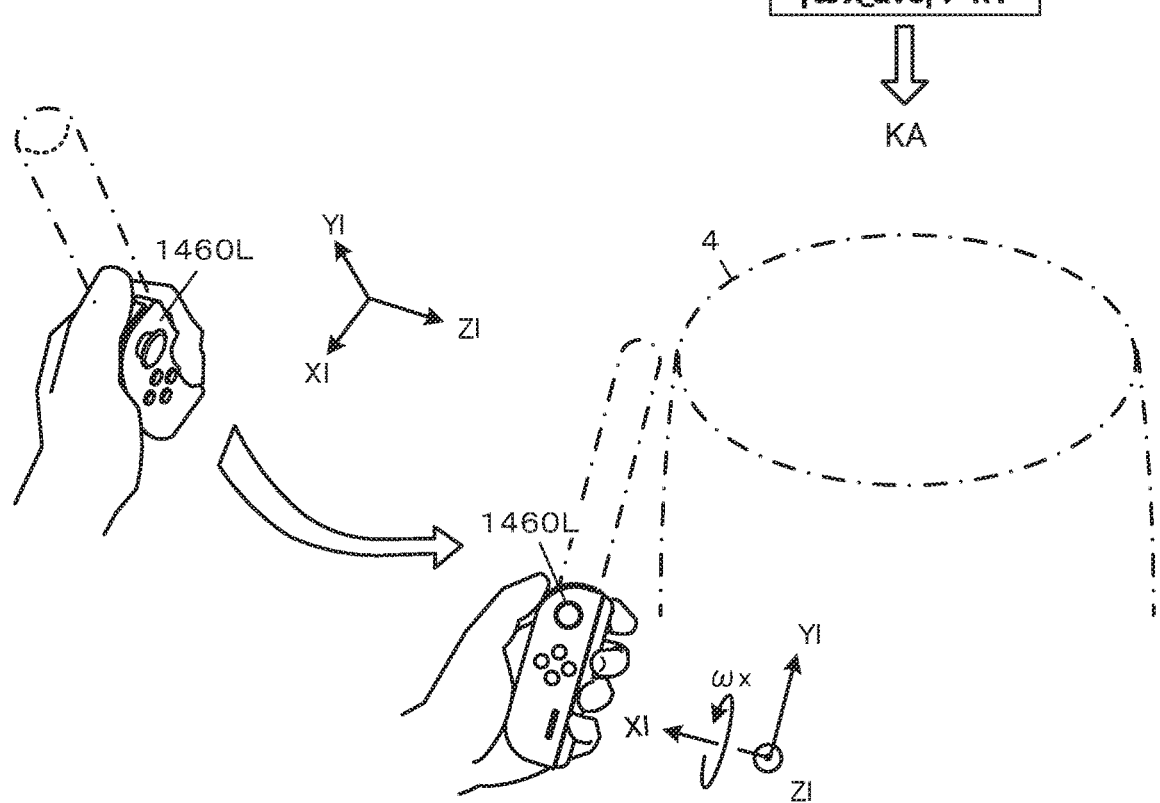

COMPUTER DEVICE AND EVALUATION CONTROL METHOD

CROSS REFERENCE TO RELATED APPLICATION

This application is a continuation of International Patent Application No. PCT/JP2018/043834, having an international filing date of Nov. 28, 2018, which designated the United States, the entirety of which is incorporated herein by reference. Japanese Patent Application No. 2017-254824 filed on Dec. 28, 2017 is also incorporated herein by reference in its entirety.

BACKGROUND

There has been developed and commercialized a technique for evaluating an input timing at which an operation input has been performed, for example, as one of gaming techniques. For example, games in a genre called music game, musical performance game, rhythm game, or the like (hereinafter, collectively called "music games") are a typical example of timing games to enjoy while correctly performing an instructed operation (reference operation: an operation input required to the player) at a predetermined timing (reference timing: target timing) accordance with the rhythm of music replayed. The player can enjoy the game by operation inputs in the rhythm with his/her selected and preferred music as BGM. Thus, this game is popular in not only a single play mode in which one player performs gameplay but also a multi-play mode in which a plurality of players cooperate with or fight against each other.

There have been proposed various techniques for enhancing interesting aspects of music games. For example, Japanese Unexamined Patent Application Publication No. 2016-10646 discloses a technique for accepting a selection of game media such as a character and an item to be used at the game, changing a timing gauge (evaluation criteria of reference timing displayed in a gauge) in accordance with the state of the selected game medium, and evaluating an operation input based on the changed timing gauge, thereby to improve the interesting aspect of the music game.

Meanwhile, stationary consumer game apparatuses or portable game devices include an acceleration sensor or a gyro sensor in a game controller, which measures the action of swinging the game controller so as to use in an operation input at the game.

For example, Japanese Unexamined Patent Application Publication No. 2008-36167 discloses a technique for identifying an operation of swinging the game controller in the air and an operation of applying a shock to the game controller, focusing on a difference in acceleration at a timing at which the increasing and decreasing directions of the acceleration value are reversed.

The music game is said to be a game in which latency or response of an operation input is extremely strict. That is, if there is a difference between a timing at which the player thinks he/she has performed an operation input and a timing at which the operation input is reflected in the game and an operation sound is emitted, the player's feeling of playing the music will be greatly hurt.

For example, a dedicated game device is prepared for arcade music games where percussion performance is a motif. The arcade game device physically has sticks for percussion performance and a part to be tapped (tapped part) by the sticks and is configured to physically measure taps on the tapped part by a switch or the like, and is designed such that the timing difference as described above does not become a problem.

However, when the same music game is executed at the game device having a game controller equipped with an acceleration sensor or a gyro sensor, the timing difference as described above may be clearly felt as the player's body sensation.

That is, the player plays the game by gripping the game controller and swinging down the game controller as sticks for percussion performance onto the tapped part that does not physically exist. At this time, in order to reproduce the feeling of tapping by himself/herself, the player does not completely swing down the game controller but operates the game controller to stop on a virtual tapped surface of the tapped part that does not physically exist.

Thus, it is natural to design the program such that a timing at which the game controller actually stops (or substantially stops) is determined from the measurement value from the acceleration sensor or the gyro sensor and this timing is determined as an operation input timing. In many cases, however, the player feels that there is a difference between the timing at which the player thinks "he/she has tapped the virtual tapped surface" and the timing at which the game controller actually stops.

The acceleration sensor and gyro sensor used in the game controller of mass-market portable game devices and stationary consumer game apparatuses are relatively inexpensive sensors and thus have a problem of low measurement accuracy and low resolution that makes the accumulated error from a zero point likely to become large. Therefore, the timing difference as described above tends to be further large, which makes it difficult to solve the timing difference problem.

The problem of a larger timing difference will lead to a reduction in resolution at the time of type discrimination among a plurality of operation inputs. For example, at a timing game the player plays by mixing a plurality of types of actions of swinging and stopping the game controller in the air, there is a possibility that the types of operation inputs that were successively performed in a short time cannot be correctly discriminated so that the player cannot gain a score although he/she did not make a mistake. One of factors behind such a reduction in resolution is a large process load because many calculations are required to suppress a timing difference.

BRIEF DESCRIPTION OF THE DRAWINGS

FIG. 2 is a diagram illustrating the game device from which the game controller is detached.

FIG. 3 is a diagram describing a game content, which illustrates a display example on a game screen.

FIG. 7 is a conceptual diagram for describing discrimination of input type of an operation input in a don-ka pattern.

DESCRIPTION OF EXEMPLARY EMBODIMENTS

Figure 1:
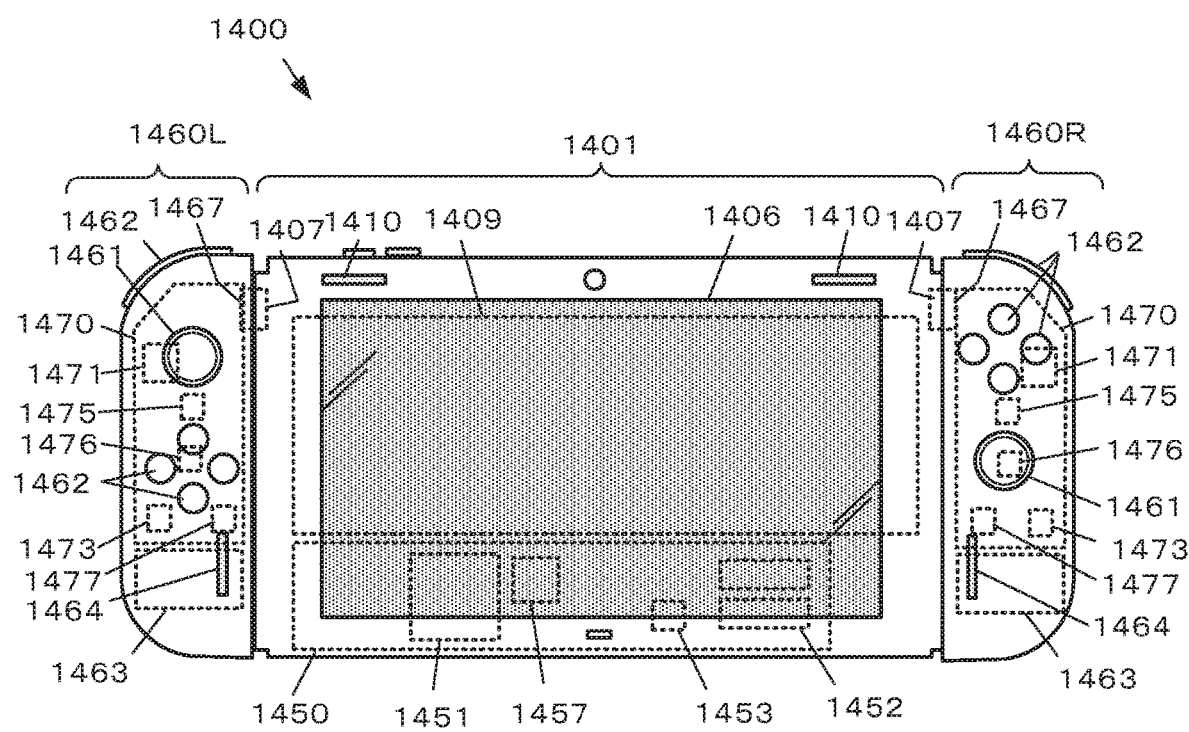
FIG. 1 is a front view of a configuration example of a game device to which a game controller is detachably attached.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

In accordance with one of some embodiments, there is provided a computer device comprising:

at least one processor or circuit programmed to perform:

presenting a reference timing and a type of a reference operation to be performed at the reference timing, the reference timing being a timing at which a player is supposed to perform a motion of swinging and stopping a controller containing an inertial sensor;

determining an input timing by detecting that a measurement value of the inertial sensor has satisfied a given input determination condition; and discriminating a type of an operation input at the input timing based on the measurement value, wherein the discriminating the type of the operation input includes inheriting the type of an operation input previously discriminated when the measurement value satisfies a given inheritance condition.

According to this aspect, it is possible to inherit the result of the latest discrimination if the measurement value of the inertial sensor satisfies the inheritance condition. That is, it is possible to reduce a process load by simplification of the calculation process required for the type discrimination.

In accordance with one of some embodiments, there is provided the computer device, wherein the inheritance condition may include at least a condition that same type of the successive reference operations are presented.

In accordance with one of some embodiments, there is provided the computer device, wherein the presenting may include presenting the reference timing as an instantaneous timing or a time range, and the inheritance condition may include at least a condition that the reference timing is presented as the time range.

As a result, in some embodiments, it is possible to determine whether the inheritance condition is satisfied in a scene where successive inputs are required. That is, it is possible to reduce a process load at the determination of successive operation inputs.

In accordance with one of some embodiments, there is provided the computer device, wherein the controller may have a plurality of operation buttons arranged on a front side and has a longitudinal shape that is capable of being gripped and held by one hand, the inertial sensor may measure at least a first acceleration along a first axis in a direction orthogonal to a longitudinal direction of the controller and a front normal direction of the controller, and the inheritance condition may include at least a condition based on the first acceleration.

As a result, in some embodiments, the inheritance of the type discrimination can be applied to the motion of swinging in the first axis direction the controller in a longitudinal shape that has a plurality of operation buttons arranged on the front side and is capable of being gripped and held by one hand. For example, the inheritance of the discrimination result is to be applied to successive actions of gripping the controller as if gripping drumsticks and tapping the air as if tapping a drum by the drumsticks. Thus, the inheritance of the discrimination result is applicable to a natural input mode.

In accordance with one of some embodiments, there is provided the computer device, wherein the inheritance condition may include at least a condition that, after magnitude of the first acceleration exceeds a given first threshold, increasing and decreasing tendencies of the first acceleration are reversed, and the magnitude of the first acceleration after the reversal exceeds a given second threshold.

As a result, in some embodiments, it is possible to determine that the inheritance condition is satisfied when the player swings up and down the controller and the momentum of this action exceeds the second threshold.

In accordance with one of some embodiments, there is provided the computer device, wherein the inertial sensor may measure, besides the first acceleration, a three-dimensional acceleration by measuring an acceleration in the longitudinal direction of the controller and an acceleration in the front normal direction of the controller, the first threshold may be a threshold based on an average of magnitudes of the three-dimensional acceleration for a predetermined past time, and the second threshold may be a threshold based on an average of magnitudes of the three-dimensional acceleration for a predetermined past time.

As a result, in some embodiments, it is possible to accurately identify whether the player made a mere unintentional motion while gripping the controller or the player made an intentional action of swinging the controller. That is, it is possible to prevent wrong execution of inheritance of the discrimination result.

In accordance with one of some embodiments, the computer device may comprise at least one processor or circuit further programmed to perform adjusting the first threshold and/or the second threshold based on an operation input of the player.

As a result, in some embodiments, the player can adjust the inheritance condition.

In accordance with one of some embodiments, there is provided the computer device, wherein determining the input timing may include determining the input timing based on, instead of the input determination condition, a second input determination condition that is easier to satisfy than the input determination condition when the measurement value satisfies the inheritance condition.

As a result, in some embodiments, while the inheritance of the discrimination result is applied, the determination of the operation input is facilitated so that successive operation inputs can be easily performed. The successive inputs are prominent among operation inputs, and tactfully performing the successive inputs is an important element for enhancing the satisfaction of the gameplay. Accordingly, the effect of enhancing the player's satisfaction at the game can be expected.

In accordance with one of some embodiments, there is provided the computer device, wherein the determining the input timing may include determining a timing at which, instead of the input determination condition, a third input determination condition based on the first acceleration is satisfied as the input timing when the measurement value satisfies the inheritance condition.

As a result, in some embodiments, the input timing can be determined based on the first acceleration.

In accordance with one of some embodiments, there is provided the computer device, wherein the determining the input timing may include determining a timing at which, instead of the input determination condition, a third input determination condition based on the first acceleration is satisfied as the input timing when the measurement value satisfies the inheritance condition.

At a game where a motion of swinging and stopping the controller by hand is set as an operation input, the operation input may be an action of tapping a virtual tapped body not existing in reality, for example. In this case, the player naturally damps the motion of the controller at the end of the motion as if reproducing a scene where the tapping tool hits against the tapped body and then stops at the timing at which the player thinks he/she has tapped the tapped body. In actuality, however, in many cases, the movement of the controller stops later than the timing at which the player thinks he/she has tapped the tapped body. This is because it takes time, although it is short, until the controller actually stops due to influence of inertia. Therefore, setting the input timing to the timing at which the movement of the controller has stopped as a timing at which the motion has been ended causes a timing difference from the timing at which the player thinks he/she has tapped, thereby producing a sense of retardation.

Thus, as a result of re-analysis of the entire motion, it has been discovered that a peak of measurement value appeared at a point of time near the timing at which the player thinks he/she has tapped. The peak of the measurement value appearing before the stop of the motion is detected by sensing a decreasing tendency of the magnitude of the first acceleration so that the input timing can be determined based on the peak. Therefore, at a game where the action of swinging and stopping the controller is regarded as an operation input, it is possible to determine an operation input timing that is close to the player's sensation without a feel of discomfort.

In accordance with one of some embodiments, the computer device may comprise at least one processor or circuit further programmed to perform notifying that an operation input satisfying the inheritance condition is being performed.

As a result, in some embodiments, it is possible to notify the player that the operation input satisfying the inheritance condition is being performed.

In accordance with one of some embodiments, there is provided an evaluation control method executed by a computer device, the method comprising:

presenting a reference timing and a type of a reference operation to be performed at the reference timing, the reference timing being a timing at which a player is supposed to perform a motion of swinging and stopping a controller containing an inertial sensor;

determining an input timing by detecting that a measurement value of the inertial sensor has satisfied a given input determination condition; and discriminating a type of an operation input at the input tinting based on the measurement value, wherein the discriminating the type of the operation input includes inheriting the type of an operation input previously discriminated when the measurement value satisfies a given inheritance condition.

According to this aspect, it is possible to implement an evaluation control method by which to obtain the same advantageous effects as those in the first aspect.

Hereinafter, examples of embodiments of the present disclosure will be described. Note that modes to which the present disclosure is applicable are not limited to the following embodiments. A game device will be described as an example of the computer device. The drawings indicate coordinate systems as appropriate for the sake of description. However, these indications merely show the directions of the coordinate axes and do not show coordinate origin points.

FIG. 1 is a front view of a portable game device as one embodiment, which illustrates a configuration example of the game device to which a game controller is detachably attached. FIG. 2 is a diagram illustrating the game device from which the game controller is detached.

A game device 1400 is a computer that is classified into a portable game device, which is designed in consideration to portability and user convenience. The game device 1400 includes a main body device 1401 and at least one attachable/detachable game controller 1460 (right game controller 1460R and left game controller 1460L).

The main body device 1401 includes a touch panel 1406 that serves as an image display device/touch position input device, connectors 1407, a built-in battery 1409, a speaker 1410, and a control board 1450. Besides, the main body device 1401 includes a power button, a volume control button, and others as appropriate.

The connectors 1407 are provided at the right and left ends of the main body device 1401 corresponding to the right game controller 1460R and the left game controller 1460L. The connectors 1407 are connected to the connectors of the right game controller 1460R and the left game controller 1460L to implement communication between the game controllers and the main body device 1401.

The control board 1450 contains various processors such as a central processing unit (CPU) 1451, a graphics processing unit (GPU), and a digital signal processor (DSP), various IC memories 1452 such as a VRAM, RAM, and ROM, a communication module 1453 for performing wireless communication with mobile phone base stations, wireless LAN base stations, other apparatuses having short-range wireless devices, and others, an interface circuit 1457, and others.

The interface circuit 1457 includes a driver circuit of the touch panel 1406, a circuit that transmits and receives signals to and from the right game controller 1460R and the left game controller 1460L via the connector 1407, an output amplifier circuit that outputs a sound signal to the speaker 1410, and others.

These elements included in the control board 1450 are electrically connected via a bus circuit or the like in a manner capable of data reading and writing and signal transmission and reception. The control board 1450 may be partly or entirely implemented by an application specific integrated circuit (ASIC), a field-programmable gate array (FPGA), or a system on a chip (SoC).

The control board 1450 has programs and various kinds of data stored in the IC memory 1452 and implements various functions to execute the game of the present embodiment by performing calculation processing based on the programs and data.

The right game controller 1460R and the left game controller 1460L are designed for the player to grip them by each one hand. Each of the right game controller 1460R and the left game controller 1460L includes a joystick 1461, a plurality of push switches 1462 as operation buttons, a vibrator 1463 as a vibration generation device, a speaker 1464, a connector 1467, a controller control board 1470, and a built-in battery (not illustrated), The controller control board 1470 includes a controller control IC 1471 that corresponds to a processor controlling the game controller, a communication module 1473, a triaxial acceleration sensor 1475 (first inertial sensor; acceleration sensor), a triaxial gyro sensor 1476 (second inertial sensor; gyroscope), and an interface circuit 1477.

Note that the controller control board 1470 can include as appropriate elements other than the foregoing ones, such as an image sensor module, for example. Otherwise, one element can perform the function of another element to omit the other element. For example, one sensor can implement the triaxial acceleration sensor 1475 and the triaxial gyro sensor 1476, or the controller control IC 1471 and the interface circuit 1477 can be integrated.

The communication module 1473 implements wireless communication with the communication module 1453 of the main body device 1401.

As illustrated in FIG. 2, the triaxial acceleration sensor 1475 of the right game controller 1460R forms local coordinates (Xr, Yr, Zr) of the right hand. Specifically, the triaxial acceleration sensor 1475 is configured such that the right side facing the right game controller 1460R (the right side in FIG. 2) is located in the normal direction of the Xr-axis, the upper side of longitudinal direction of the controller (the upper side in FIG. 2) is located in the normal direction of the Yr-axis, and the side normal to the front side of the controller, that is, the side in front of the front side of the controller (the front side in FIG. 2) is located in the normal direction of the Zr-axis.

The triaxial gyro sensor 1476 of the right game controller 1460R forms the local coordinates (Xr, Yr, Zr) of the right hand and is configured to detect the angular speed of the right game controller 1460R around each axis of the triaxial acceleration sensor 1475.

An attachment 1468 is attachable to the left end of the right game controller 1460R to cover the connector 1467. The right game controller 1460R is gripped such that the right side of the controller is held by the thumb and ball of the user's right hand and the attachment 1468 of the controller is wrapped by the user's forefinger, middle finger, ring finger, and little finger. In other words, the right game controller 1460R is gripped and held by one hand such that the rear side opposite to the front side faces the user's palm.

Similarly, the triaxial acceleration sensor 1475 of the left game controller 1460L forms local coordinates (Xl, Yl, Zl) of the left hand. Specifically, the triaxial acceleration sensor 1475 is configured such that the left side facing the left game controller 1460L (the left side in FIG. 2) is located in the normal direction of the Xl-axis, the upper side of longitudinal direction of the controller (the upper side in FIG. 2) is located in the normal direction of the Yl-axis, and the side normal to the front side of the controller, that is, the side in front of the front side of the controller (the front side in FIG. 2) is located in the normal direction of the Zl-axis.

The triaxial gyro sensor 1476 of the left game controller 1460L forms the local coordinates (Xl, Yl, Zl) of the left hand and is configured to detect the angular speed of the left game controller 1460L around each axis of the triaxial acceleration sensor 1475.

The attachment 1468 is attachable to the right end of the left game controller 1460L to cover the connector 1467. The left game controller 1460L is gripped such that the left side of the controller is held by the thumb and ball of the user's left hand and the attachment 1468 of the controller is wrapped by the user's forefinger, middle finger, ring finger, and little finger. In other words, the left game controller 1460L is gripped and held by one hand such that the rear side opposite to the front side faces the user's palm.

Returning to FIG. 1, the interface circuit 1477 includes a circuit for implementing wired communication with the control board 1450 of the main body device 1401 via the connector 1467. The interface circuit 1477 implements exchange of signals between various devices included in the controller (the joystick 1461, the push switches 1462, the vibrator 1463, the speaker 1464, the triaxial acceleration sensor 1475, the triaxial gyro sensor 1476, and others) and the main body device 1401.

Next, a game according to the present embodiment will be described.

FIG. 3 is a diagram describing a game content according to the present embodiment, which illustrates a display example on a game screen. The game according to the present embodiment is one of rhythm games, which is a music game under the theme of performance of a virtual percussion instrument at which, while listening music emitted (replayed) from the speaker 1410 of the main body device 1401, the player swings the right game controller 1460R and the left game controller 1460L to perform an operation input in accordance with the rhythm of the music.

A player 2 grips the right game controller 1460R and the left game controller 1460L as if gripping handles of virtual tapping tools of a virtual percussion instrument. Assuming that there are long sticks (although they are invisible) on the opposite side of the right game controller 1460R and the left game controller 1460L and there is a virtual percussion instrument 4 (although it is invisible) in front of the player, the player performs an operation input by swinging down the right game controller 1460R and the left game controller 1460L as if tapping the virtual percussion instrument 4. At the game according to the present embodiment, the virtual percussion instrument 4 is a Japanese drum that is longitudinally arranged with the drum surface facing the front side of the player 2 and near the waist of the player 2.

When the gameplay is started, the music with which the game is to be played is emitted from the speaker 1410 of the main body device 1401, and a game screen W3 is displayed on the touch panel 1406.

The game screen W3 displays a lapse time display section 10 indicating a lapse time from the play start, a music title 12, and a musical note 20. The design of the musical note 20 may be set as appropriate. In the present embodiment, the musical note 20 has a standard position 24 that is shown on the left side of the screen, indicators 25 (25*a*, 25*b*) that are displayed in a flowing manner toward the standard position 24, bar lines 26, an evaluation result display part 27, and a score display part 28.

The standard position 24 indicates a position as a reference for showing a reference timing (a timing for an operation input as a target). In the present embodiment, only one standard position 24 is displayed on one musical note 20. Alternatively, a plurality of standard positions 24 may be provided.

The indicators 25 are prepared in different designs according to the type of a reference operation (a correct operation input to be performed at the reference timing). In the present embodiment, the indicators 25 appear from the right side of the musical note 20 and are displayed to linearly flow leftward to the standard position 24 together with the bar lines 26. The part between the bar lines 26 indicates one bar in the play music. The timing at which the indicator 25 overlaps the standard position 24 is the reference timing in the present embodiment, and the type of the overlapping indicator 25 indicates the type of the reference operation.

The evaluation result display part 27 displays an input evaluation based on: 1) a difference between the reference timing and the input timing of the operation input; and 2) a match or non-match between the reference operation and the type of the operation input, where the timing at which the center of the indicator 25 overlaps the center line of the standard position 24 is the reference timing and the type of the overlapping indicator 25 is reference operation. For example, a higher evaluation is given when there is a match between the reference operation and the type of the operation input and the difference between the reference timing and the operation input timing is smaller.

The score display part 28 displays the accumulation of scores given according to the evaluation result of the operation input.

In the present embodiment, there are a plurality of types of reference operations and a plurality of types of indicators 25 corresponding to the reference operations.

Figure 4:
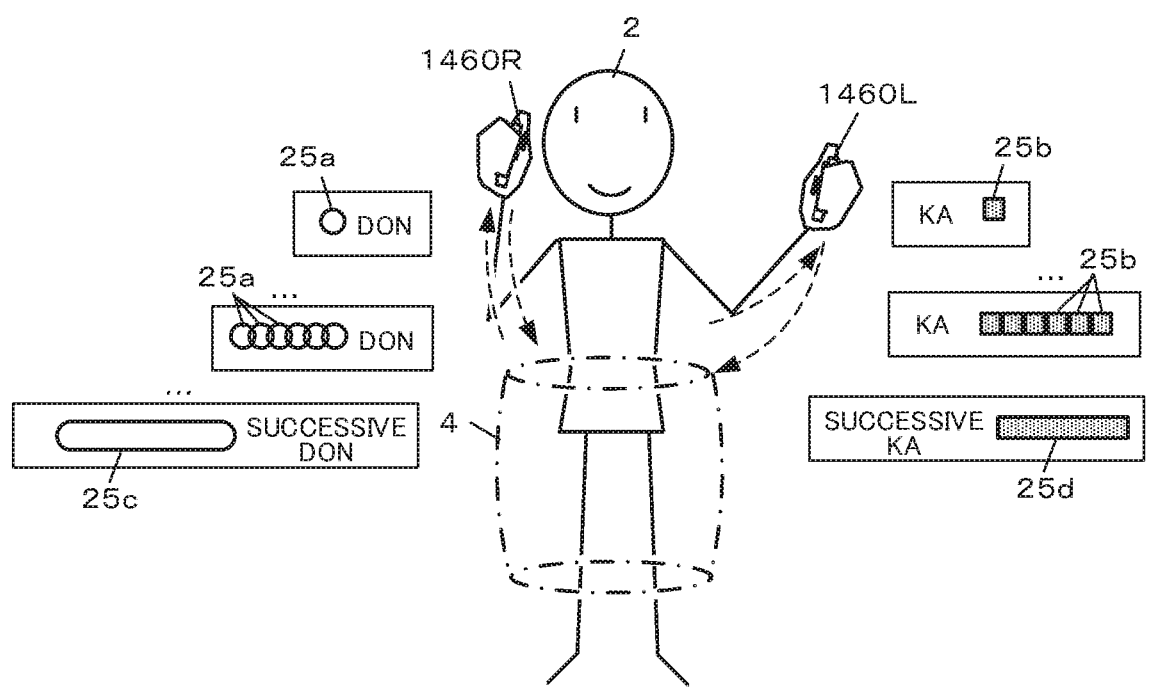
FIG. 4 is a diagram illustrating examples of types of reference operations.

As illustrated in FIG. 4, the types of basic operation inputs includes: a don type typified by a don 25*a* (white circle) as a first type indicator that indicates a first type operation of tapping the drum surface of the virtual percussion instrument 4 (Japanese drum); and a ka type typified by a ka 25*b* (shaded square) as a second type indicator that indicates a second type operation of tapping the edge of the drum surface or the outer periphery of the trunk part of the drum.

The ways of presenting the reference timing are divided into an "instantaneous presentation type" in which the reference timing is presented as "instantaneous timing" such as the don 25*a* and the ka 25*b* and a "range presentation type" in which the reference timing is presented as "time range" such as a successive don 25*c* and a successive ka 25*d*.

The don 25*a* and the ka 25*b* are basically indicators of the instantaneous presentation type. However, successively presenting a plurality of indicators at short time intervals makes it possible to present the same type of successive reference operations.

The successive don 25*c* is an indicator of the range presentation type that presents the same type of successive reference operations by itself alone. That is, the first type operation is a reference operation. The reference timing is always determined while this indicator is located at the standard position 24. When the operation input matches the reference operation, the input of the successive don 25*c* is given a favorable evaluation at any timing while the indicator is located at the standard position 24. Thus, as a rule, it is possible to gain a higher score by performing the first type operation more and more while the successive don 25*c* is located at the standard position 24. Naturally, the player is required to perform successive operation inputs, that is, "successive tapping inputs".

Similarly, the successive ka 25*d* is an indicator that presents the same type of successive reference operations by itself alone, which is an indicator of the range presentation type in which the second type operation is a reference operation. The reference timing is always determined while the indicator is located at the standard position 24. Naturally, the player is required to perform successive inputs.

As a matter of course, the case where successive inputs are required can be implemented by successively presenting the indicator of the instantaneous presentation type at relatively short time intervals.

Note that reference operations and indicators of types other than the foregoing ones can be set as appropriate.

In the present embodiment, an input timing is first determined. When the input timing is determined, the input type of the operation input is determined. Then, the operation input is evaluated by comparison of the determined input timing and operation input type with the reference timing and reference operation presented on the musical note 20 at that time.

First, a principle of the input timing determination according to the present embodiment will be described.

Whether the first type operation (don) or the second type operation (ka), the motion of the player 2 includes three successive actions: a "swing-up action" and a "swing-down action" like tapping a drum with drumsticks, and a "damping action of stopping the drumsticks at a complete swing-down position Ps that is regarded as the drum surface of the virtual percussion instrument 4" because it is virtual percussion performance.

Focusing on more details, the player's motion can be classified into the motion of tapping with the snap of the wrists involving the angular speed of the wrists and the motion of tapping with the wrists less turned and almost fixed. The former motion is frequently seen in intermittent and single tapping and the later motion is frequently seen in successively repeated tapping for a short time. Thus, the former will be called "single motion" and the latter will be called "successive motion".

First, the determination of an input timing in the single motion will be described.

Figure 5:
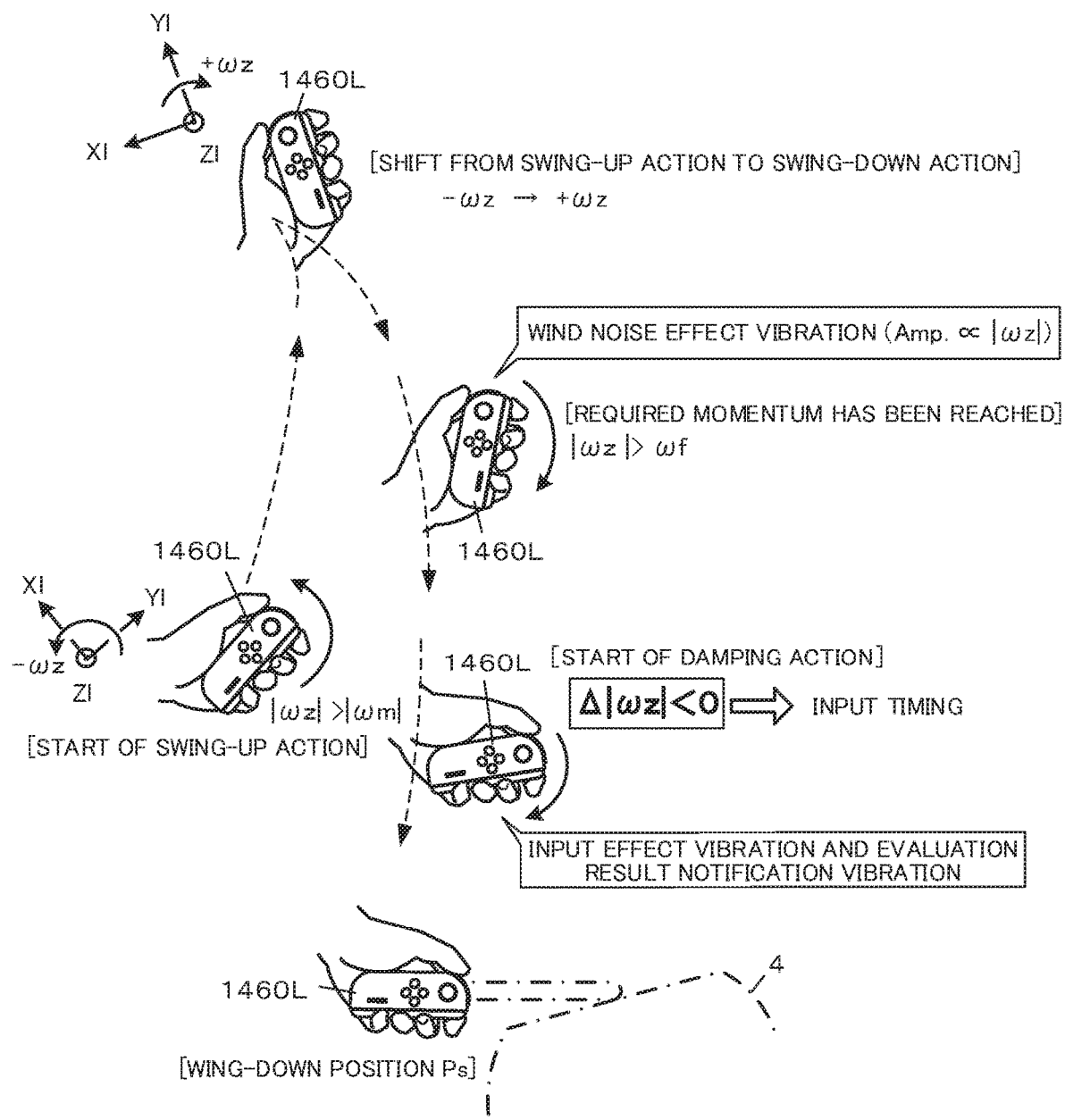
FIG. 5 is a conceptual diagram for describing determination of an input timing for single motion.

FIG. 5 is a diagram for describing the determination of an input timing for the single motion. Herein, the description will be given taking the left game controller 1460L as an example. However, the same description is applicable to the right game controller 1460R by replacing local coordinates of the left hand with local coordinates of the right hand.

Further focusing on changes in the posture of the left game controller 1460L, the single motion includes starts of the three actions constituting the motion and transfers to the three actions. In the present embodiment, based on changes in angular speed ωz around a Zl-axis measured by the triaxial gyro sensor 1476, the single motion of the first type operation is correctly identified to properly determine the input timing.

Specifically, first, when the absolute value of the angular speed ωz around a Z-axis measured by the triaxial gyro sensor 1476 exceeds a predetermined swing-up start determination criteria angular speed value ωm, it is determined that the "swing-up action" has been started. The angular speed ωz in this case indicates rotation in a minus direction in the left-hand coordinate system. Thus, when the absolute value of the angular speed ωz falls under a predetermined minus standard value equivalent to the swing-up start determination criteria angular speed value ωm, it can be determined that the swing-up action has been started.

Next, After the swing-up action has been started, when it is detected that the angular speed ωz around the Zl-axis is reversed between the positive and negative directions, it is determined that switching from the swing-up action to the swing-down action has taken place. In other words, it is determined that the swing-down action has been started successively from the swing-up action. This will be called "premise determination". In the presence of the premise determination, it is possible to prevent erroneous determination by excluding unconscious actions other than operation inputs, such as rotating the wrists to relieve wrist tension, for example.

After the premise determination, when the absolute value of the angular speed ωz around the Zl-axis has reached a predetermined required momentum determination criteria angular speed ωf, it is determined that the player is intentionally performing the swing-down action as the single motion of the first type operation. This makes it possible to discriminate between the player's action of merely lowering the hands with fatigue and the player's swing-down action. The angular speed ωz at this time indicates rotation in a plus direction in the left-hand coordinate system. Thus, when the angular speed ωz has reached a predetermined plus threshold equivalent to the required momentum determination criteria angular speed ωf, it can be determined that the player is performing the swing-down action.

In the present embodiment, at the timing at which the required momentum determination criteria angular speed ωf has been reached, the vibrator 1463 of the left game controller 1460L generates vibration. Vibration strength Amp is set in proportion to the angular speed ωz measured at that time so that the player can feel like as if the virtual stick-type tapping tools make wind noise by performing the swing-down action. This will be called "wind noise effect vibration".

Then, when a temporal change Δ|ωz| of the absolute value of the angular speed ωz around the Z-axis measured by the triaxial gyro sensor 1476 becomes negative during the swing-down action, it is determined that the player has started the damping action. Shift of the temporal change of the absolute value of the angular speed ωz from positive value to negative value means that the absolute value of the angular speed ωz changes from an increasing tendency to a decreasing tendency. Thus, the peak of the absolute value of the angular speed ωz is determined. In other words, the peak of the measurement value that appears immediately before the player stops the single motion is detected. Upon detection of this peak, it is determined that the damping action has been started. In the present embodiment, basically, this determined timing is regarded as the input timing of the single motion.

However, even after the start of the damping action, the left hand and the left game controller 1460L actually reach the lower swing-down position Ps, that is, the position where the player imagines he/she has tapped the surface or its edge of the virtual percussion instrument 4 or a further lower position due to the momentum of the swing-down action (inertia).

In the present embodiment, at the input timing of the single motion, the vibrator 1463 of the left game controller 1460L generates input effect vibration. The "input effect vibration" is vibration for reproducing the feel of the virtual tapping tools hitting the surface or its edge of the virtual percussion instrument 4. Basically, different vibrations are generated in accordance with the discrimination result of the type of the operation input. In the present embodiment, the input effect vibration also serves as "evaluation result notification vibration" that notifies the evaluation result. That is, the vibration is generated at a vibration strength and in a vibration pattern in accordance with the evaluation result of the operation input.

Either the wind noise effect vibration or the input effect vibration can be omitted.

Next, determination on the input timing in the successive motion will be described.

Figure 6:
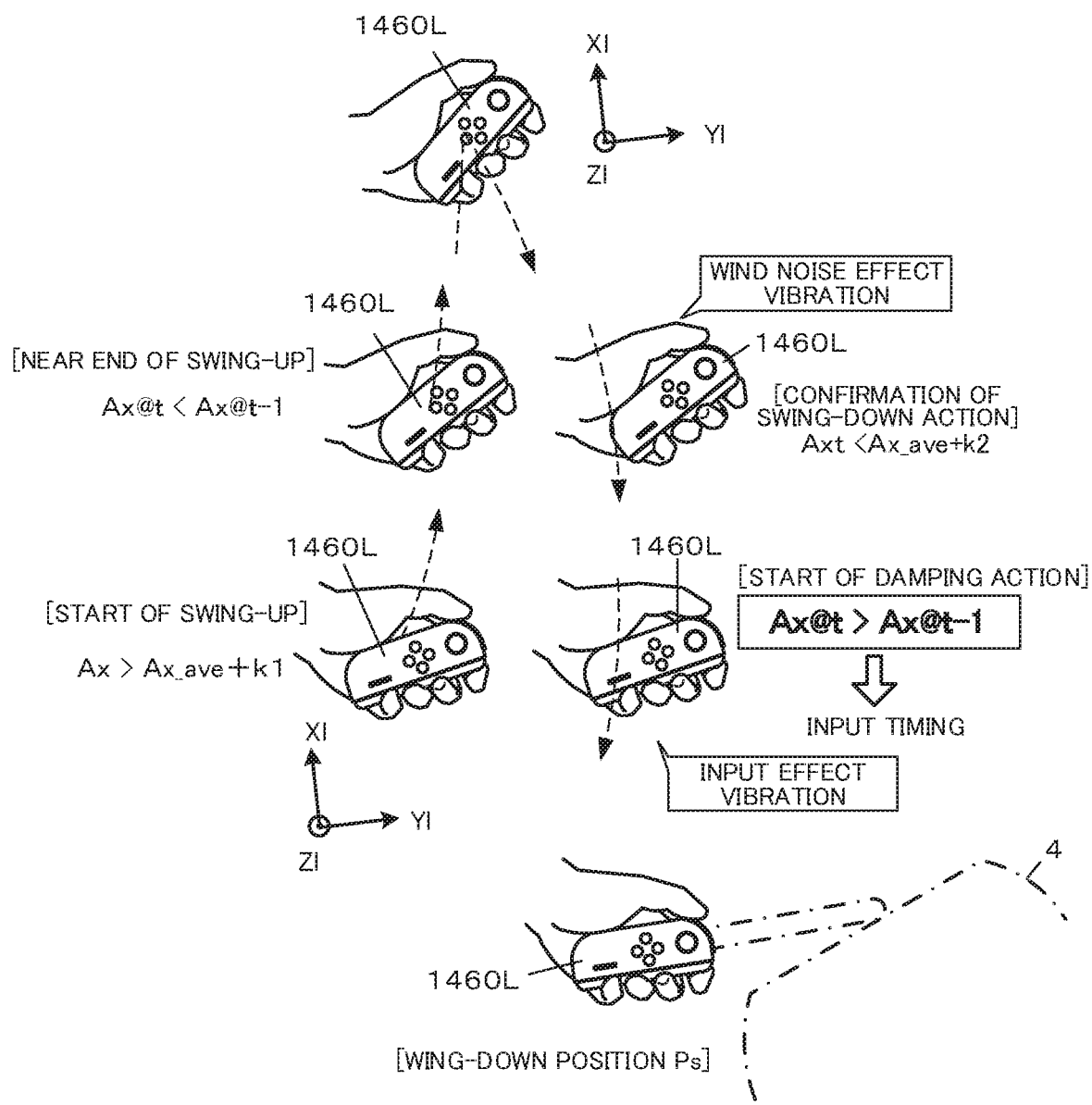
FIG. 6 is a conceptual diagram for describing determination of an input timing for successive motion.

FIG. 6 is a conceptual diagram for describing determination of an input timing for the successive motion. Herein, the description will be given taking the left game controller 1460L as an example. However, the same description is applicable to the right game controller 1460R by replacing local coordinates of the left hand with local coordinates of the right hand.

The successive motion is performed with the wrists at almost constant positions and thus cannot be identified based on the posture change unlike in the case of the single motion. Accordingly, the successive motion is correctly identified to appropriately determine the input timing based on changes in the acceleration measured by the triaxial acceleration sensor 1475 of the left game controller 1460L.

Specifically, the player grips and operates the left game controller 1460L while putting the ball of the thumb on the left end of the controller facing upward. Then, when an acceleration Ax along the Xl-axis measured by the triaxial acceleration sensor 1475 exceeds a first threshold obtained by adding a predetermined swing-up start determination criteria coefficient k1 to an average acceleration Ax_ave that is an average value of the past accelerations Ax, it is determined that the player has started the "swing-up action".

The average acceleration Ax_ave is an average value of accelerations measured about 10 to 15 times by the triaxial acceleration sensor 1475. Although depending on the specifications of the sensor used, the measurement cycle can be a relatively slow cycle of about 4 to 6 ms on the whole.

Then, when it is detected that an acceleration Ax@t at time t has become smaller than an acceleration Ax@t−1 measured in the previous measurement cycle, that is, when it is detected that the increasing and decreasing tendencies have been reversed, it is determined that the player is about to end the swing-up action and will shift to the swing-down action soon. This determination corresponds to the premise determination in the successive motion.

After the premise determination, when the player shifts to the swing-down action, the acceleration Ax along the Xl-axis is measured at a negative value. Accordingly, when the acceleration Ax along the Xl-axis falls under a second threshold obtained by adding a predetermined confirmed determination criteria coefficient k2 to the average acceleration Ax_ave, it is determined that the player is intentionally performing the swing-down action in the successive motion. This makes it possible to discriminate between the player's action of merely lowering the hands with fatigue and the player's swing-down action. In the successive motion as well, the "wind noise effect vibration" is generated.

Then, the player shifts from the swing-down action to the damping action. At that time, the value of the acceleration Ax along the X1-axis measured by the triaxial acceleration sensor 1475 increases from the negative value toward "0" along with the deceleration.

Therefore, when it is detected that to acceleration Ax@t at time t has become larger than the acceleration Ax@t−1 measured in the previous measurement cycle, that is, when it is detected that the increasing and decreasing tendencies have been reversed, it is determined that the player has started the damping action. In other words, when the peak of the measurement value that appears immediately before the player stops the successive motion is detected, it is determined that the player has started the damping action.

In the present embodiment, basically, this determined timing is regarded as the input timing of the successive motion.

However, even after the start of the damping action, the left hand and the left game controller 1460L actually reach the lower swing-down position Ps, that is, the position where the player imagines he/she has tapped the surface or its edge of the virtual percussion instrument 4 or a further lower position due to the momentum of the swing-down action (inertia).

Also, when the input timing of the successive motion has been determined, the vibrator 1463 of the left game controller 1460L generates the input effect vibration.

There may be an additional condition to be satisfied for the determination of an input timing that the total of the absolute values of accelerations measured along all the three axes is equal to or greater than a predetermined value. Providing the additional condition makes it possible to correctly determine the input timing even if the player is prone to bend his/her wrists during the swing-down action at the input timing.

Conventionally, the input timing is considered as a timing at which the value measured by the triaxial acceleration sensor 1475 or the triaxial gyro sensor 1476 of the left game controller 1460L has reached a value with which it is determined that the game controller has stopped. However, the player feels a sense of discomfort because there is a difference between the timing at which the player thinks "he/she has just tapped the virtual tapped surface" and the timing at which the game controller has actually stopped.

In the present embodiment, however, it is possible to detect, as the input timing, the player's action of starting to damp the swing-down of his/her wrists at the timing at which he/she thinks "he/she has tapped the virtual tapped surface" or its close timing, thereby to determine the input timing matching the player's sensation.

Next, type discrimination of an operation input will be described.

Focusing on how to swing the hands down, the motions of the first type operation (don) and the second type operation (ka) can be said to be respectively vertical swing-down motion in which the player swings down his/her hands in a vertical direction and curved swing-down motion in which the player swings down his/her hands in a curve.

Further, focusing on the motion of the second type operation (ka), there are a pattern of performing the second type operation following the first type operation (don-ka pattern) and a pattern of repeating the second type operation (ka-ka pattern). In reverse, there is also a pattern of performing the first type operation following the second type operation (ka-don pattern).

FIG. 7 is a conceptual diagram for describing discrimination of input type of an operation input in the don-ka pattern. Herein, the description will be given taking the left game controller 1460L as an example. However, the same description is applicable to the right game controller 1460R by replacing local coordinates of the left hand with local coordinates of the right hand.

Focusing on the track of the left game controller 1460L in the don-ka pattern, the player swings up the left game controller 1460L outward in the swing-up action. When being viewed from the player's front side, the track of the swing-up action goes obliquely upward. Then, the player performs the swing-down action with the snap of his/her wrist.

In other words, focusing on the posture of the left game controller 1460L, the left game controller 1460L is on its side (the left side in FIG. 7) with the Z1-axis facing the player at the end of the swing-up action and with the Y1-axis facing upward. Through the swing-down action, the Z1-axis changes to face obliquely upward and then face substantially just above, and the Y1-axis changes to face in front of the player. That is, the left game controller 1460L rotates around the Y1-axis. This motion does not appear in the motion of the first type operation (don) described above.

Thus, when the absolute value of an angular speed ωx around the X1-axis measured by the triaxial gyro sensor 1476 of the left game controller 1460L exceeds a predetermined third determination criteria value k3 and the absolute value of an average angular speed ωx_ave as the average value of the angular speed ωx exceeds a predetermined fourth determination criteria value k4, it is determined that the player has input the second type operation (ka).

The angular speed ωx at this time is measured in a minus value in the left-hand local coordinate system. Thus, when the angular speed ωx reaches a predetermined minus threshold equivalent to the third determination criteria value k3 and the average angular speed ωx_ave reaches a minus threshold equivalent to the fourth determination criteria value k4, it can be determined that the player has input the second type operation (ka).

The average angular speed ωx_ave is an average value of angular speeds measured about 10 to 15 times by the triaxial gyro sensor 1476. Although depending on the specifications of the sensor used, the measurement cycle can be a relatively slow cycle of about 4 to 6 ms on the whole.

Figure 8:
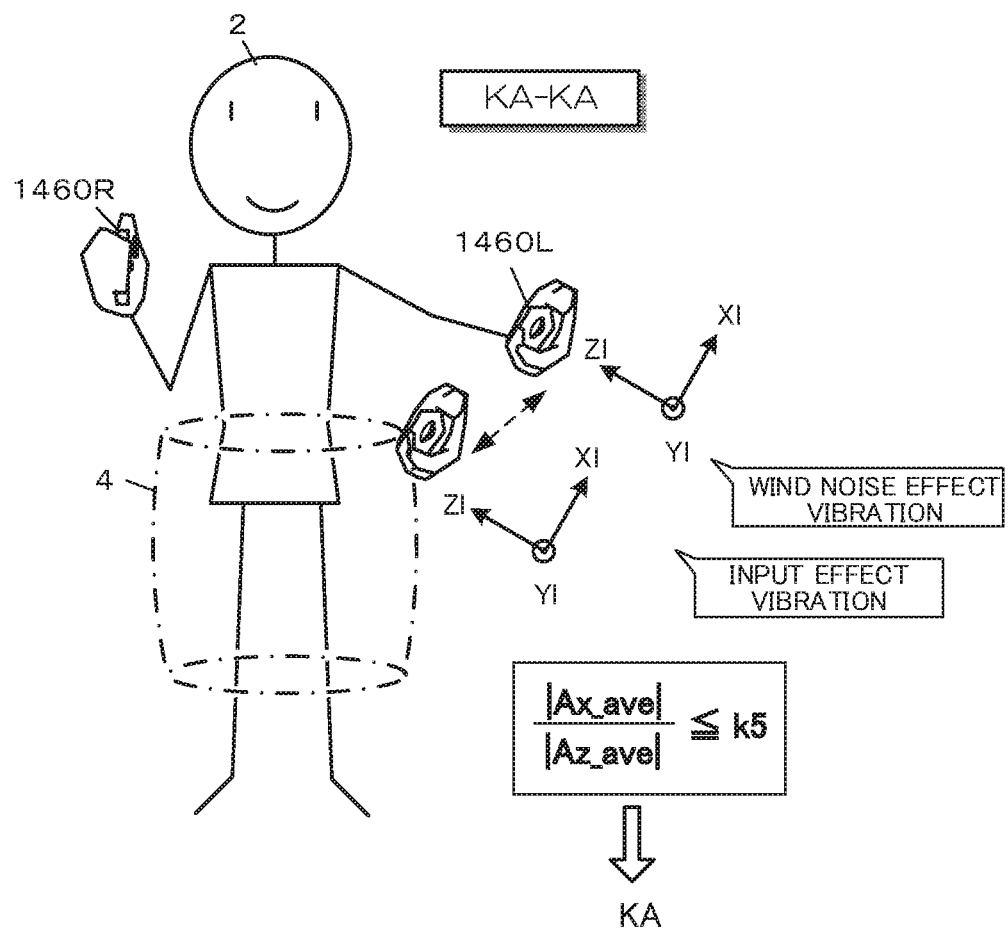
FIG. 8 is a conceptual diagram for describing discrimination of input type of an operation input in a ka-ka pattern.

FIG. 8 is a conceptual diagram for describing discrimination of input type of an operation input in the ka-ka pattern. Herein, the description will be given taking the left game controller 1460L as an example. However, the same description is applicable to the right game controller 1460R by replacing local coordinates of the left hand with local coordinates of the right hand.

Focusing on the track of the left game controller 1460L in the ka-ka pattern, the front direction of the left game controller 1460L (the normal direction of the Z1-axis) is kept obliquely upward. This oblique movement in the oblique posture does not appear in the motion of the first type operation (don) described above.

Thus, when the ratio between the absolute value of the average acceleration Ax_ave along the X1-axis measured by the triaxial acceleration sensor 1475 of the left game controller 1460L and the absolute value of an average acceleration Az_ave along the Z1-axis is equal to or less than a predetermined fifth determination criteria value k5, it is determined that the player has input the second type operation (ka).

Figure 9:
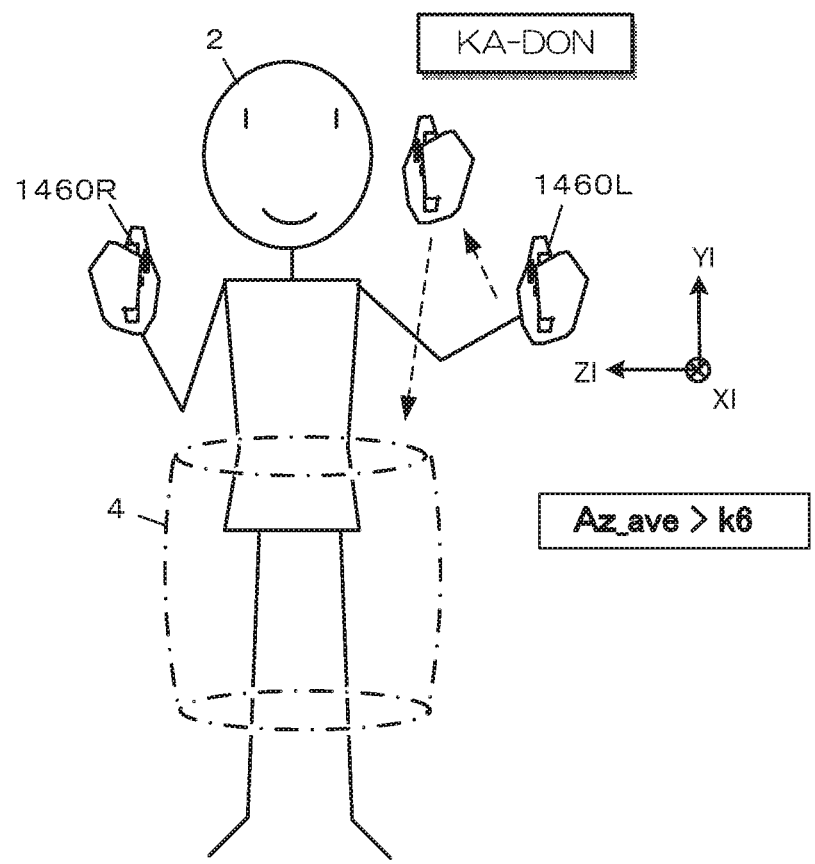
FIG. 9 is a conceptual diagram for describing discrimination of input type of an operation input in a ka-don pattern.

FIG. 9 is a conceptual diagram for describing discrimination of input type of an operation input in the ka-don pattern. Herein, the description will be given taking the left game controller 1460L as an example. However, the same description is applicable to the right game controller 1460R by replacing local coordinates of the left hand with local coordinates of the right hand.

The input start position of the second type operation (ka) is more outside than the input start position of the first type operation (don). In addition, the input start position of the first type operation is higher in many cases. Thus, focusing on the track of the left game controller 1460L in the ka-don pattern, the motion of the left game controller 1460L includes the movement in the front normal direction of the controller.

Thus, when the average acceleration Az_ave along the Zl-axis measured by the triaxial acceleration sensor 1475 of the left game controller 1460L exceeds a predetermined sixth determination criteria value k6, it is determined that the player has input the first type operation (don).

In the present embodiment, except for the input type discrimination by these three patterns, all the inputs are discriminated as the first type operation (don).

The input timing determination described above and the input type discrimination make it possible to correctly identify a plurality of types of intermixed operation inputs while appropriately determining sensory input timings at which the player thinks he/she has tapped the drum.

The basic input determination can be implemented by the input timing determination and the input type discrimination. However, the ways of rotating the arms and bending the wrists in the swing-up action and the swing-down action might not be the same as described above. For some players, there may occur a slight difference between the input timing at which the player thinks he/she has tapped the drum and the input timing determined by the method described above.

Thus, in the present embodiment, there is prepared a timing adjustment function of setting an adjustment time related to determination of an input timing.

Figure 10:
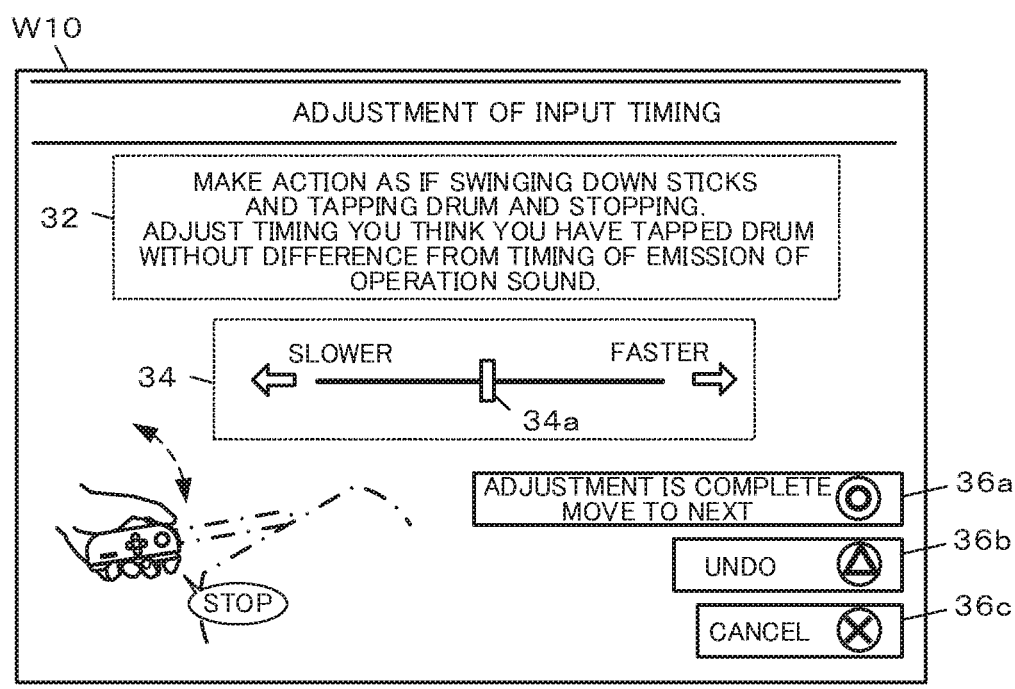
FIG. 10 is a diagram illustrating a display example on an operation screen related to setting of an adjustment time.

FIG. 10 is a diagram illustrating a display example on an operation screen related to setting of the adjustment time. For setting the adjustment time, an adjustment screen W10 is displayed on the touch panel 1406. The adjustment screen W10 includes instructions 32 for adjustment procedure, an adjustment operation part 34, and various operation icons 36 (36a, 36b, . . . ). The design of the adjustment operation part 34 may be set as appropriate. In the present embodiment, the adjustment operation part 34 is designed such that a setting bar 34a is to be moved by a touch & slide operation.

At timing adjustment, when the player performs the first type operation as a trial, an operation sound is emitted at a timing after a lapse of an initial adjustment time from the input timing. The player operates the adjustment operation part 34 to minimize a difference between the timing he/she imagines and the timing at which the operation sound is emitted. Then, the result of the timing adjustment is stored as an applied adjustment time in the IC memory 1452 or the like and will be applied to the subsequent determination of an input timing. The adjustment can be basically made only to delay the timing. However, presetting a value larger than 0 as the initial adjustment time and decreasing the initial adjustment time to be closer to 0 makes it possible to make pseudo-adjustment of accelerating the determination of an input timing.

Figure 11:
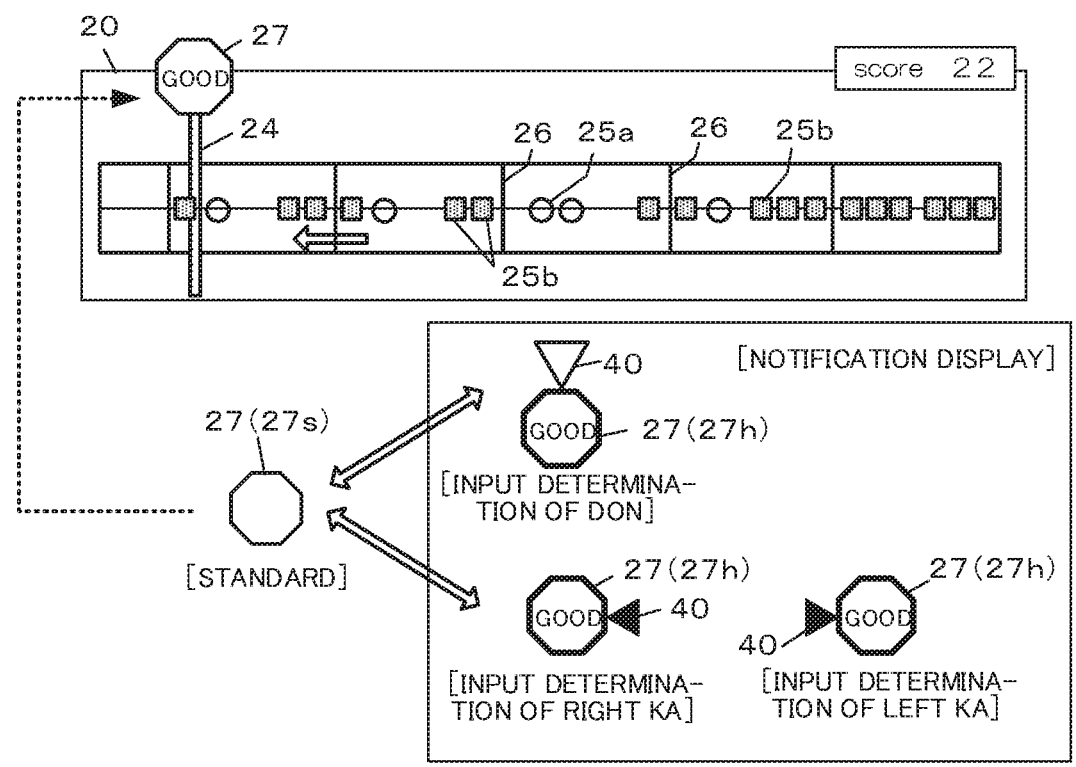
FIG. 11 is a diagram illustrating a display example of results of input timing determination and input type discrimination on the game screen.

FIG. 11 is a diagram illustrating a display example of results of input timing determination and input type discrimination on the game screen.

The input timing is notified at the evaluation result display part 27 on the game screen during gameplay. Specifically, the input timing is determined and the display mode of the frame for the evaluation result (design elements such as display color, line thickness, and the presence or absence of shadow) is temporarily changed from a standard mode 27s to a notification mode 27h. In the example of FIG. 11, the notification mode is shown with emphasized outlines.

In addition, together with the input timing, the input type discrimination result of the operation input is notified on the game screen. For example, when it is determined that the player has performed the first type operation (don), a type notification marker 40 is temporarily added to the upper side of the evaluation result display part 27. When it is determined that the player has performed the second type operation (ka) by the right game controller 1460R, the type notification marker 40 is temporarily added to the right side of the evaluation result display part 27. When it is determined that the player has performed the second type operation (ka) by the left game controller 1460L, the type notification marker 40 is temporarily added to the left side of the evaluation result display part 27.

In the present embodiment, it can also be said that the display mode of the type notification marker 40 (for example, the shape and display color of the marker, the presence or absence of blinking, and the like) is changed whether the input timing to be evaluated has been determined using acceleration or using angular speed, thereby notifying which of the determination methods were used. Specifically, when the input timing has been determined using acceleration, the display color is white, and when the input timing has been determined using angular speed, the display color is black. When the operation input has been determined as successive input, the marker can be displayed in a special large size. As a matter of course, the way of notification is not limited to this. For example, effect display may be used such as changing the background of the musical note 20 or displaying a special character on the screen.

Description of Functional Configuration

Figure 12:
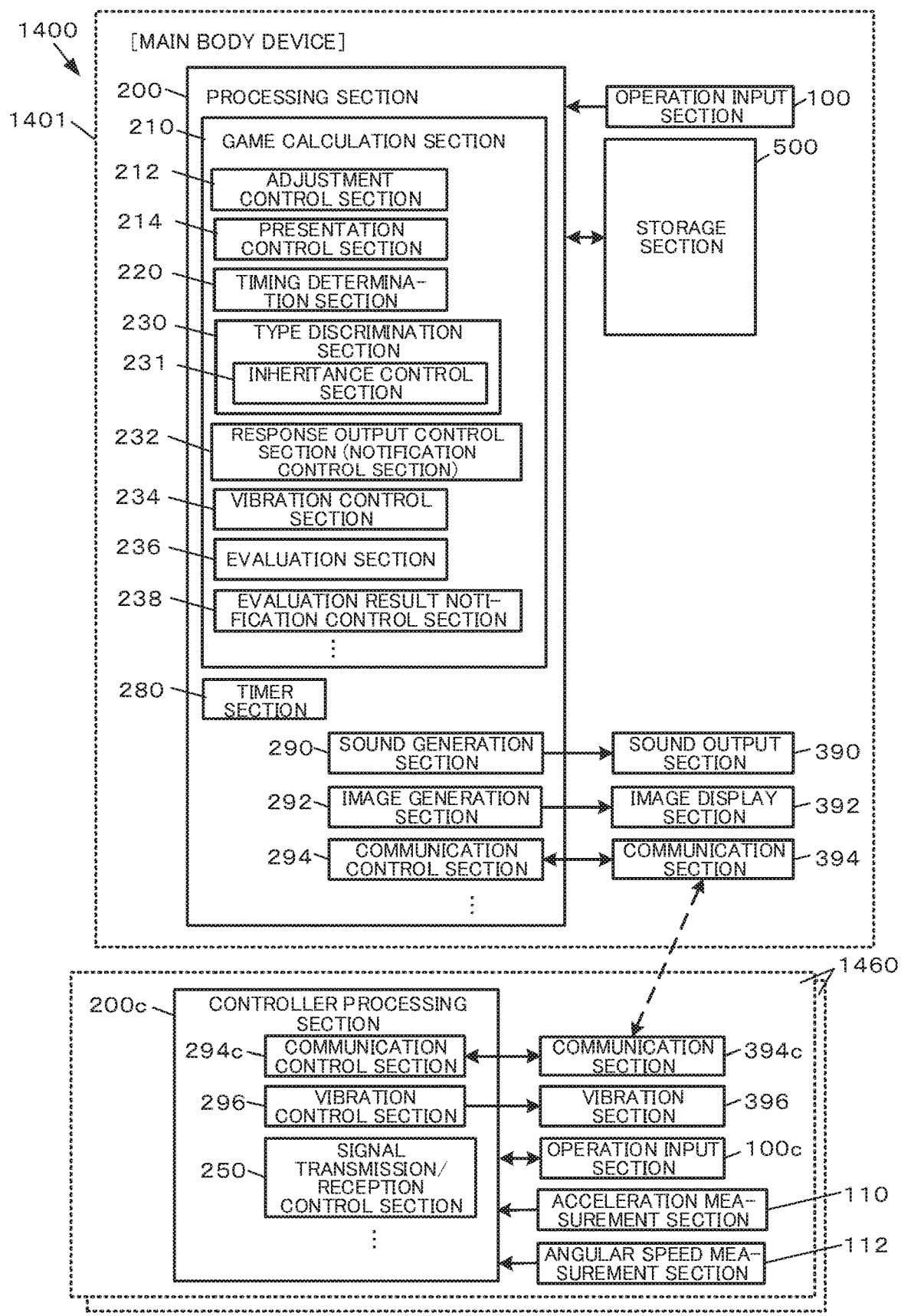
FIG. 12 is a functional block diagram illustrating a functional configuration example of the game device.

FIG. 12 is a functional block diagram illustrating a functional configuration example of the game device 1400 according to the present embodiment. The game device 1400 according to the present embodiment includes an operation input section 100, a processing section 200, a sound output section 390, an image display section 392, a communication section 394, and a storage section 500 in a main body device 1401.

The game controller 1460 (the right game controller 1460R and the left game controller 1460L) includes an operation input section 100c, an acceleration measurement section 110, an angular speed measurement section 112, a controller processing section 200c, a communication section 394c, and a vibration section 396.

The operation input section 100 is a means for inputting various operations. The operation input section 100 can be implemented by a switch, lever, dial, joystick, touch panel, trackpad, touch pad, or the like. In the configuration of FIG. 1, the touch panel 1406 corresponds to the operation input section 100. The processing section 200 is implemented by, for example, a processor such as a CPU or GPU and electronic components such as an ASIC, FPGA, and IC memory. The processing section 200 controls input/output of data between the functional sections including the operation input section 100 and the storage section 500. The processing section 200 executes various calculation processes based on predetermined programs, data, and operation input signals from the operation input section 100 and the game controller 1460 to entirely control the operation of the game device 1400. In the example of FIG. 1, the control board 1450 corresponds to the processing section 200.

The processing section 200 according to the present embodiment includes a game calculation section 210, a timer section 280, a sound generation section 290, an image generation section 292, and a communication control section 294. Note that functional sections other than these may be included as appropriate.

The game calculation section 210 executes various processes related to game progress control. In the present embodiment, the game calculation section 210 has an adjustment control section 212, a presentation control section 214, a timing determination section 220, a type discrimination section 230, a response output control section 232, a vibration control section 234, an evaluation section 236, and an evaluation result notification control section 238.

The adjustment control section 212 performs a process related to setting of the adjustment time by which to temporally adjust the determination of an input timing based on an operation input of the player. In the present embodiment, a display control related to the adjustment screen W10 and a change/setting control of the adjustment time in accordance with various operations related to the adjustment screen correspond to the adjustment time setting section 212 (see FIG. 10).

The presentation control section 214 performs a control to present reference timings at which the player is supposed to perform a motion of swinging and stopping a controller containing an inertial sensor by hand and present the types of reference operations to be performed at the reference timings.

That is, the presentation control section 214 performs a control to present the player each of the reference timings in order of arrival at which he/she is supposed to perform the motion of swinging and stopping the game controller 1460 by hand. In the present embodiment, performing a control to display the first type indicator 25*a* and the second type indicator 25*b* in a flowing manner on the musical note 20 such that the indicators overlap at the standard position 24 at the reference timing corresponds to this control (see FIG. 3).

The timing determination section 220 determines the input timing at each reference timing by detecting that the measurement value of the inertial sensor has satisfied a given input determination condition.

Specifically, the timing determination section 220 has a premise determination section that determines whether the swing-down action has been started successively from the swing-up action based on the measurement value. The premise determination section determines whether the swing-down action has been started successively from the swing-up action based on the acceleration in a first axis direction orthogonal to the longitudinal direction of the game controller and the front normal direction of the game controller. The premise determination section determines whether the swing-down action has been started successively from the swing-up action based on an angular speed around a second axis with which the front normal direction of the game controller aligns.

When the premise determination section makes an affirmative determination, the timing determination section 220 detects the peak of acceleration in the first axis measured in the swing-down action by detecting a reversal between the increasing and decreasing tendencies of measurement value, and makes a primary determination of the input timing based on the timing of the detection. The timing determination section 220 can make the primary determination on the input timing by detecting the peak of the angular speed around the second axis. The timing determination section 220 finally determines a timing obtained by making an adjustment of a preset adjustment time to the timing of the primary determination (the timing at which the peak was detected) as the input timing.

In the present embodiment, determining the input timing based on the accelerations measured by the triaxial acceleration sensor 1475 of the right game controller 1460R and the left game controller 1460L (specifically, the accelerations along the Xl-axis and the Xr-axis) and the angular speeds measured by the triaxial gyro sensor 1476 (specifically, the angular speeds, angular speeds around the Zl-axis and the Zr-axis (see FIGS. 5 and 6)) corresponds to this final determination.

The type discrimination section 230 discriminates the type of an operation input at an input timing based on the measurement value of the inertial sensor. In the present embodiment, discriminating which of the first type operation (don) and the second type operation (ka) has been input corresponds to this discrimination.

The type discrimination section 230 has an inheritance control section 231.

The inheritance control section 231 inherits the latest discrimination result if the measurement value of the inertial sensor satisfies a given inheritance condition. That is, the type discrimination section 230 discriminates that the latest discrimination result is the same as the previous discrimination result.

In the present embodiment, the inheritance condition includes at least that the presentation of the reference timings and the types of the reference operations is the presentation of the same type of successive reference operations. In the present embodiment, the successive presentation of pluralities of don 25*a* and ka 25*b* at short time intervals and the presentation of successive don 25*c* and successive ka 25*d* correspond to this condition. Alternatively, the former case can be excluded.

More specifically, the inheritance condition is a condition based on an acceleration along the first axis direction (direction orthogonal to a longitudinal direction of the controller and a front normal direction of the controller: acceleration Ax along the X-axis in the present embodiment) measured by the inertial sensor. That is, the inheritance condition is set to include at least 1) after the magnitude of the first acceleration exceeds a given first threshold, 2) the increasing and decreasing tendencies of the first acceleration are reversed, and 3) the magnitude of the first acceleration after the reversal exceeds a given second threshold (see FIG. 6).

When the timing determination section 220 has determined an input timing, the response output control section 232 immediately performs a response output by sound and/or display. In the present embodiment, the response output is made when the input timing has been determined and the type of the operation input has been discriminated by the type discrimination section 230. The emission of an operation sound from the speaker 1410 of the main body device 1401 corresponds to the response output. The response output also includes a control of temporarily changing the display mode of the evaluation result display part 27 from the standard mode 27s to the notification mode 27h and a control of displaying the type notification marker 40 (see FIG. 11). The generation of input effect vibration by the vibrator 1463 of the game controller 1460 also corresponds to the response output (see FIGS. 5 and 6).

The response output control section 232 also serves as a notification control section that notifies execution of an operation input satisfying the inheritance condition. In the present embodiment, the control of displaying the type notification marker 40 in a size larger than the standard size corresponds to this notification control section (see FIG. 11).

When the premise determination section of the timing determination section 220 makes an affirmative determination, the vibration control section 234 activates the vibration device of the game controller in the swing-down action. In the present embodiment, the generation of wind noise effect vibration by the vibrator 1463 of the game controller 1460 corresponds to this (see FIGS. 5 and 6).

At each reference timing, the evaluation section 236 makes an evaluation based on a difference between the reference timing and the determined input timing in sequence. More specifically, the evaluation section 236 makes an evaluation based on the difference between the reference timing and the input timing and on whether the discriminated input type and the standard type are the same. In the case of the indicator of the range presentation type, the evaluation section 236 determines that there is a match between the reference timing and the input timing within the time range specified by the indicator and evaluates whether the input type and the standard type are the same.

The evaluation result notification control section 238 performs a control to notify the determined evaluation result at each reference timing. In the present embodiment, a display control of evaluation result by the evaluation result display part 27 corresponds to this (see FIG. 11). Further, a generation control of input effect vibration in a vibration pattern or at a vibration magnitude in accordance with the evaluation result by the vibrator 1463 (the vibration device) of the game controller 1460 corresponds to this (see FIGS. 5 and 6).

The timer section 280 uses a system clock to measure the current date and time, a lapse time from play start, a limited time period, and others.

The sound generation section 290 is implemented by an IC or execution of software for generating sound data or performing decoding, which generates or decodes data of sounds and BGM related to gameplay. The sound generation section 290 outputs a sound signal to the sound output section 390. In the present embodiment, the sound generation section 290 performs a reproduction/emission control based on music data of the music with which the gameplay is to be performed. In addition, the sound generation section 290 can perform a reproduction/emission control of tapping effect sounds by the type of an operation input.

The sound output section 390 emits sounds based on the input sound signal. In the example of FIG. 1, the speaker 1410 corresponds to the sound output section 390.

The image generation section 292 can generate image data and others of various display screens such as the game screen W3 (see FIG. 3). The image generation section 292 can output an image signal based on the image data to the image display section 392.

The image display section 392 displays various images based on the image signal input from the image generation section 292. For example, the image display section 392 can be implemented by an image display device, such as a flat panel display, a cathode ray tube (CRT), a projector, or a head-mounted display. In the example of FIG. 1, the touch panel 1406 corresponds to the image display section 392.

The communication control section 294 performs a data process related to data communication, and implements exchange of data with an external device through the communication section 394.

The communication section 394 connects to a communication line to implement communications. The communication line is a communication channel that enables data communications. Specifically, the communication line includes a communication network such as a local area network (LAN) using a private line (private cable) for direct connection, Ethernet (registered trademark), and the like, a telecommunication network, a cable network, and the Internet. The communication method may be a cable communication method or a wireless communication method. Thus, the communication section 394 is implemented by a transceiver, a modem, a terminal adaptor (TA), a jack for wired communication cable, a control circuit, or the like, for example. In the example of FIG. 1, the communication module 1453 corresponds to the communication section 394.

The storage section 500 stores programs and various kinds of data for implementing functions for the processing section 200 to comprehensively control the game device 1400, The storage section 500 is used as a work area for the processing section 200, and temporarily stores the results of calculations performed by the processing section 200 in accordance with various programs. This function is implemented by an IC memory such as a RAM or a ROM, a magnetic disc such as a hard disc, an optical disc such as a CD-ROM or a DVD, an online storage, or the like, for example. In the example of FIG. 1, the IC memory 1452 included in the control board 1450 corresponds to the storage section 500.

Figure 13:
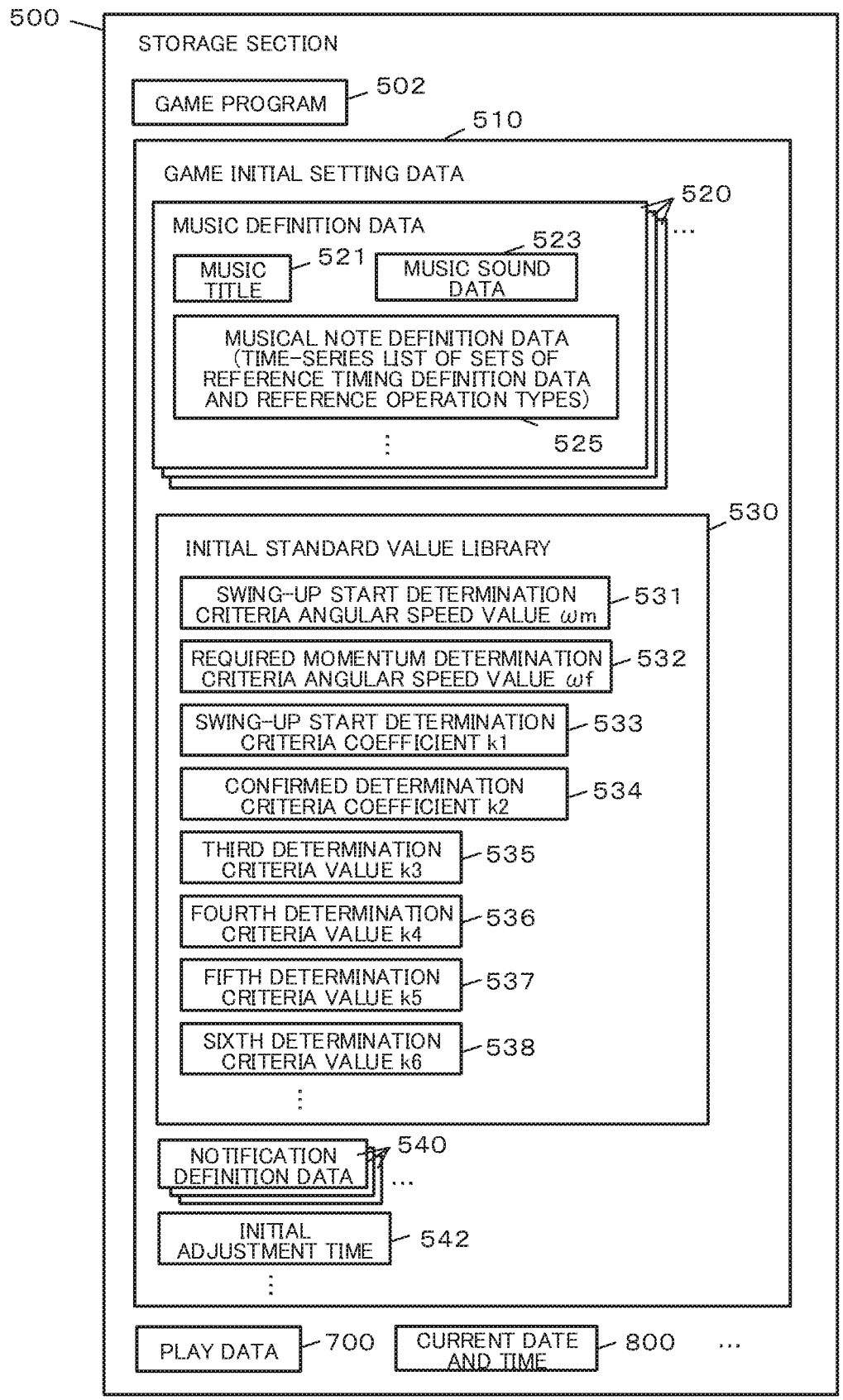
FIG. 13 is a diagram illustrating an example of programs and data stored in a storage section.

FIG. 13 is a diagram illustrating an example of programs and data stored in the storage section 500 according to the present embodiment. The storage section 500 stores in advance a game program 502 and game initial setting data 510. The storage section 500 also stores play data 700 and current date and time 800 as data to be successively generated and managed. Besides, the storage section 500 can store information of timer, counter, various flags, and others as appropriate.

The game program 502 is a program that is read and executed by the processing section 200 to implement the function of the game calculation section 210 (see FIG. 12). The game program 502 can include as appropriate programs for implementing functions of the timer section 280, the sound generation section 290, the image generation section 292, and the communication control section 294.

The game initial setting data 510 stores various types of initial setting data for executing the game. In the present embodiment, the game initial setting data 510 includes music definition data 520, an initial standard value library 530, notification definition data 540, and an initial adjustment time 542. Note that data other than the foregoing ones can be included as appropriate.

The music definition data 520 is prepared for each music to be played in the game and includes various types of initial setting data related to the music. For example, one music definition data 520 includes a unique music title 521, music sound data 523, and musical note definition data 525 for displaying the musical note 20 (see FIG. 3). Note that data other than the foregoing ones can be included as appropriate.

The musical note definition data 525 is basic data for displaying various indicators in a flowing manner on the musical note 20. The data configuration may be set as appropriate. For example, combinations of the reference timing (for example, described as a lapse time front play start) and the type of a reference operation (for example, the type of the indicators displayed in a flowing manner on the musical note 20) can be stored on a time-series basis. Note that data other than the foregoing ones can be stored as appropriate. For example, the reference operations of the same type can be stored in association with the discrimination between the required strength levels (for example, discrimination between strong and weak levels).

The initial standard value library 530 stores standard values and thresholds to be used for determination of an input timing and discrimination of input type of an operation input. In the present embodiment, the library includes: a swing-up start determination criteria angular speed value 531 ($\omega m$), a required momentum determination criteria angular speed value 532 ($\omega f$), a swing-up start determination criteria coefficient 533 (k1), a confirmed determination criteria coefficient 534 (k2), a third determination criteria value 535 (k3), a fourth determination criteria value 536 (k4), a fifth determination criteria value 537 (k5), and a sixth determination criteria value 538 (k6). Note that standard values and thresholds other than these may be included as appropriate.

The notification definition data 540 includes various types of definition data for making notifications for informing the player of operation input status, game progress status, and others, and is prepared for each notification method. In the present embodiment, the notification definition data 540 includes wind noise effect vibration (see FIGS. 5 and 6) and input effect vibration and evaluation result notification vibration (see FIGS. 5 and 6). The latter is prepared for each type of operation inputs (in the present embodiment, the first type operation (don) and the second type operation (ka)). For each of the types, data defining whether to output a vibration pattern is stored in association with each evaluation result.

The play data 700 is prepared for each gameplay and includes various kinds of data for implementing the play and describing the game progress status and others.

Figure 14:
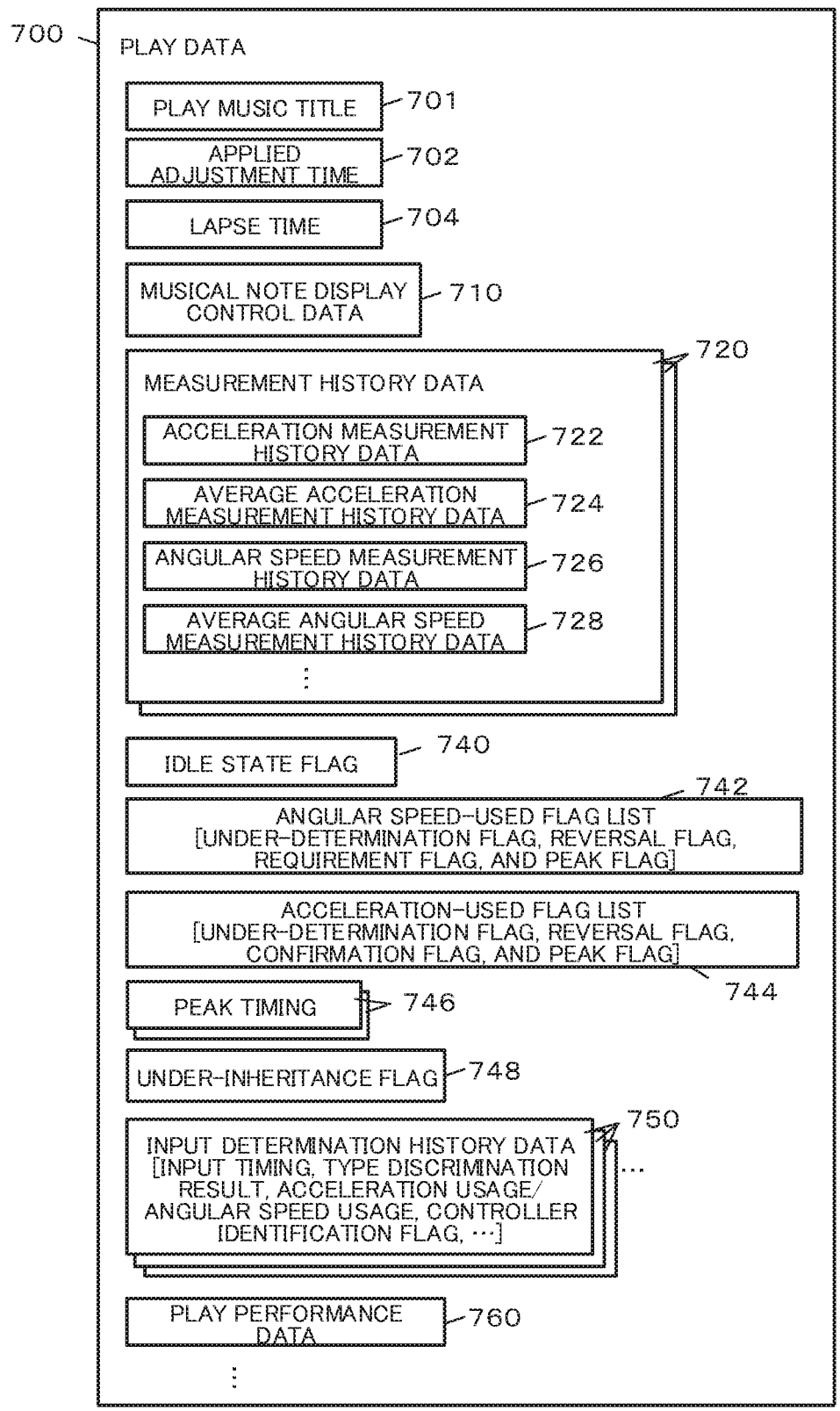
FIG. 14 is a diagram illustrating a data configuration example of play data.

In the present embodiment, as illustrated in FIG. 14, for example, the play data 700 includes: a play music title 701 that indicates a music selected by the player before play start; an applied adjustment time 702; a lapse time 704 from play start; musical note display control data 710 for controlling display on the musical note 20; measurement history data 720 that is prepared for each game controller 1460; an idle state flag 740 that indicates an idle state as a state waiting for determination of an input timing; an angular speed-used flag list 742; an acceleration-used flag list 744; a peak timing 746; an under-inheritance flag 748; input determination history data 750; and play performance data 760. Note that data other than the foregoing ones can be included as appropriate.

The applied adjustment time 702 includes a value of adjustment time of an applied input timing. The applied adjustment time 702 is initialized by the initial adjustment time 542 (see FIG. 13) and is changed in accordance with a setting operation of the adjustment time on the adjustment screen W10 (see FIG. 10).

The measurement history data 720 is prepared for each game controller 1460 and includes values measured by the controller and values to be used for determination of an input timing and discrimination of type of an operation input calculated from the measurement values on a time-series basis. In the present embodiment, the measurement history data 720 includes: acceleration measurement history data 722 containing acceleration measurement values of the three axes; average acceleration measurement history data 724 containing average accelerations of the three axes; angular speed measurement history data 726 containing angular speed measurement values of the three axes; and average angular speed measurement history data 728 containing average angular speeds of the three axes. Note that data other than the foregoing ones can be included as appropriate.

The angular speed-used flag list 742 includes various flags to be used for determination of an input timing using angular speed. In the present embodiment, the angular speed-used flag list 742 includes: an under-determination flag indicating that the determination of an input timing is being performed using angular speed; a reversal flag that is set up when a reversal between the positive and negative directions of the angular speed $\omega z$ around the Z-axis is detected; a requirement flag that is set up when the angular speed $\omega z$ has reached required momentum; and a peak flag that is set up when a peak of the angular speed $\omega z$ is detected during the swing-down action.

The acceleration-used flag list 744 includes various flags to be used for determination of an input timing using acceleration. In the present embodiment, the acceleration-used flag list 744 includes: an under-determination flag indicating that the determination of an input timing is being performed using acceleration; a reversal flag that is set up when a reversal from the increasing tendency of the X-axis acceleration Ax is detected; a confirmation flag that is set up when it is confirmed that the player is intentionally performing the swing-down action; and a peak flag that is set up when a peak of the acceleration Ax is detected during the swing-down action.

At the type discrimination of an operation input, the under-inheritance flag 748 indicates whether to inherit the previous type discrimination result as the latest type discrimination result (determines that the type of the latest operation input is the same as the type of the previous operation input). The initial state is set to "0 (not to be executed or not permitted)", and is set to "1 (to be executed or permitted)" when the inheritance condition is satisfied. When an inheritance termination condition is satisfied, the under-inheritance flag 748 is returned to "0".

The input determination history data 750 is generated at each determination of an input timing and discrimination of type of an operation input and includes information indicating the results of the determination and discrimination. For example, one input determination history data 750 includes: 1) input timing; 2) type discrimination result; 3) information indicating whether input timing determination and type discrimination have been performed using acceleration or angular speed ("acceleration usage/angular speed usage" in FIG. 14); and 4) a controller identification flag indicating of which game controller 1460 the determination and discrimination results are indicated by the input. Note that data other than the foregoing ones can be stored as appropriate. For example, when the determination and type discrimination of an operation input include identification of input strength (corresponding to the strength of tapping the virtual percussion instrument 4), the input determination history data 750 can also include information on the determined strength.

Description of Operations

Figure 15:
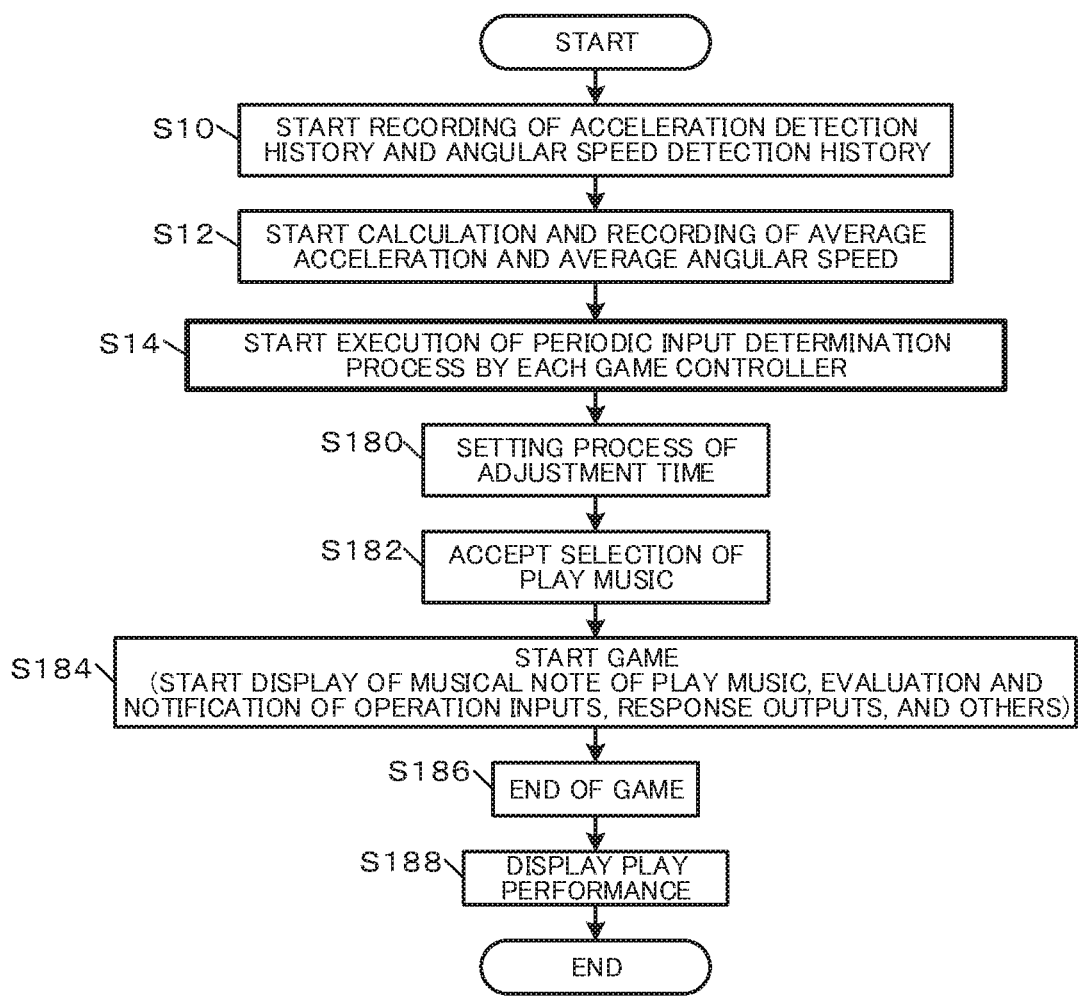
FIG. 15 is a flowchart of a process performed by the game device.

FIG. 15 is a flowchart of a process performed by the game device 1400 according to the present embodiment. The flow of the process described herein is implemented by the processing section 200 executing the game program 502.

The local coordinate systems of the right and left game controllers 1460 will be illustrated and described in common by an X-axis, a Y-axis, and a Z-axis.

First, the game device 1400 starts recording of measurement values of each game controller 1460 (step S10), and then starts calculation and recording of a value (average value in the present embodiment) to be used for the determination of an input timing and the type discrimination of an operation input from the measurement values (step S12). That is, the game device 1400 starts recording and updating of the measurement history data 720 in steps S10 and S12 (see FIG. 14).

Then, the game device 1400 starts execution of a periodic input determination process for each game controller 1460 (step S14).

Figure 16:
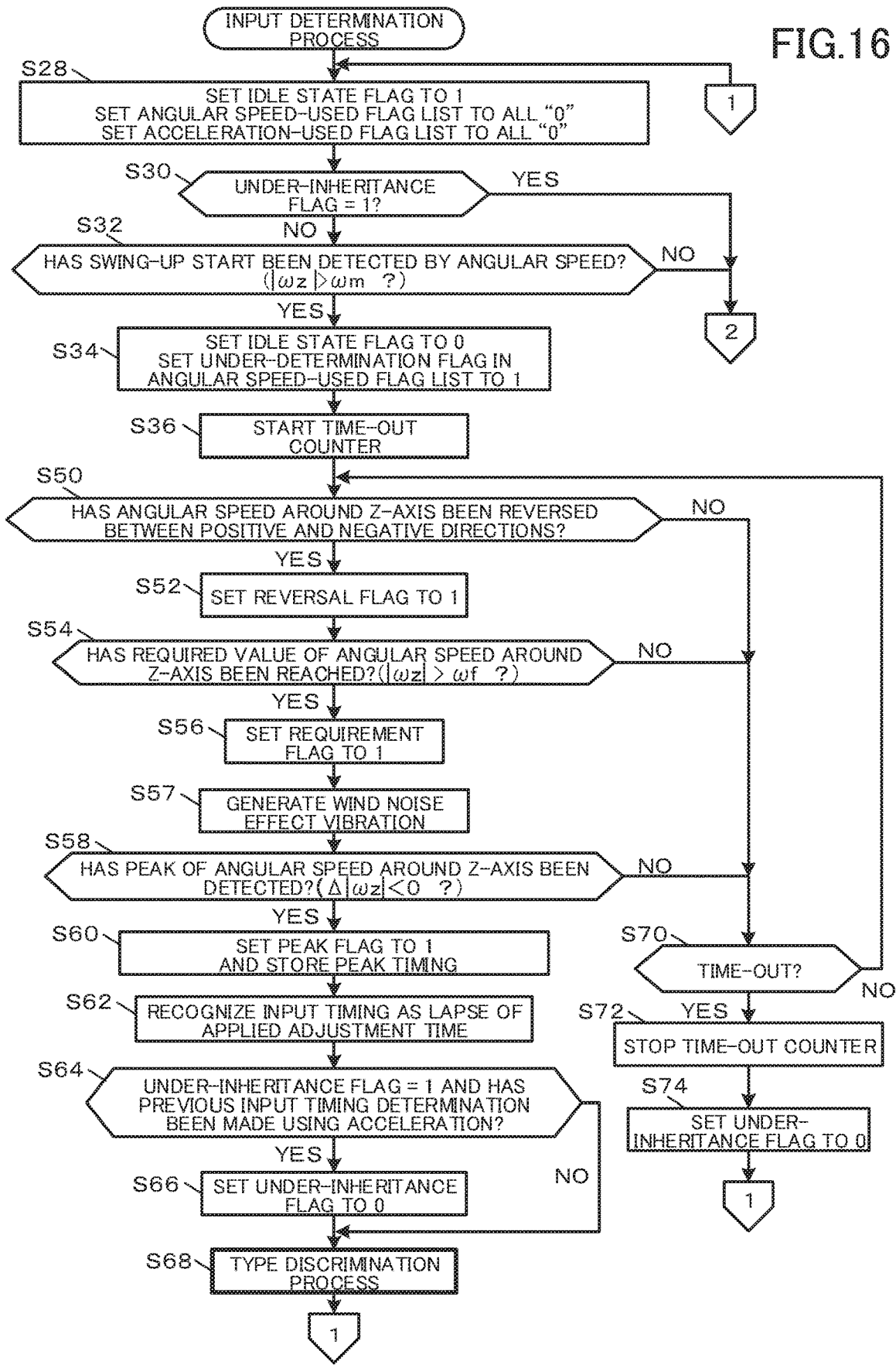
FIG. 16 is a flowchart of an input determination process.
Figure 17:
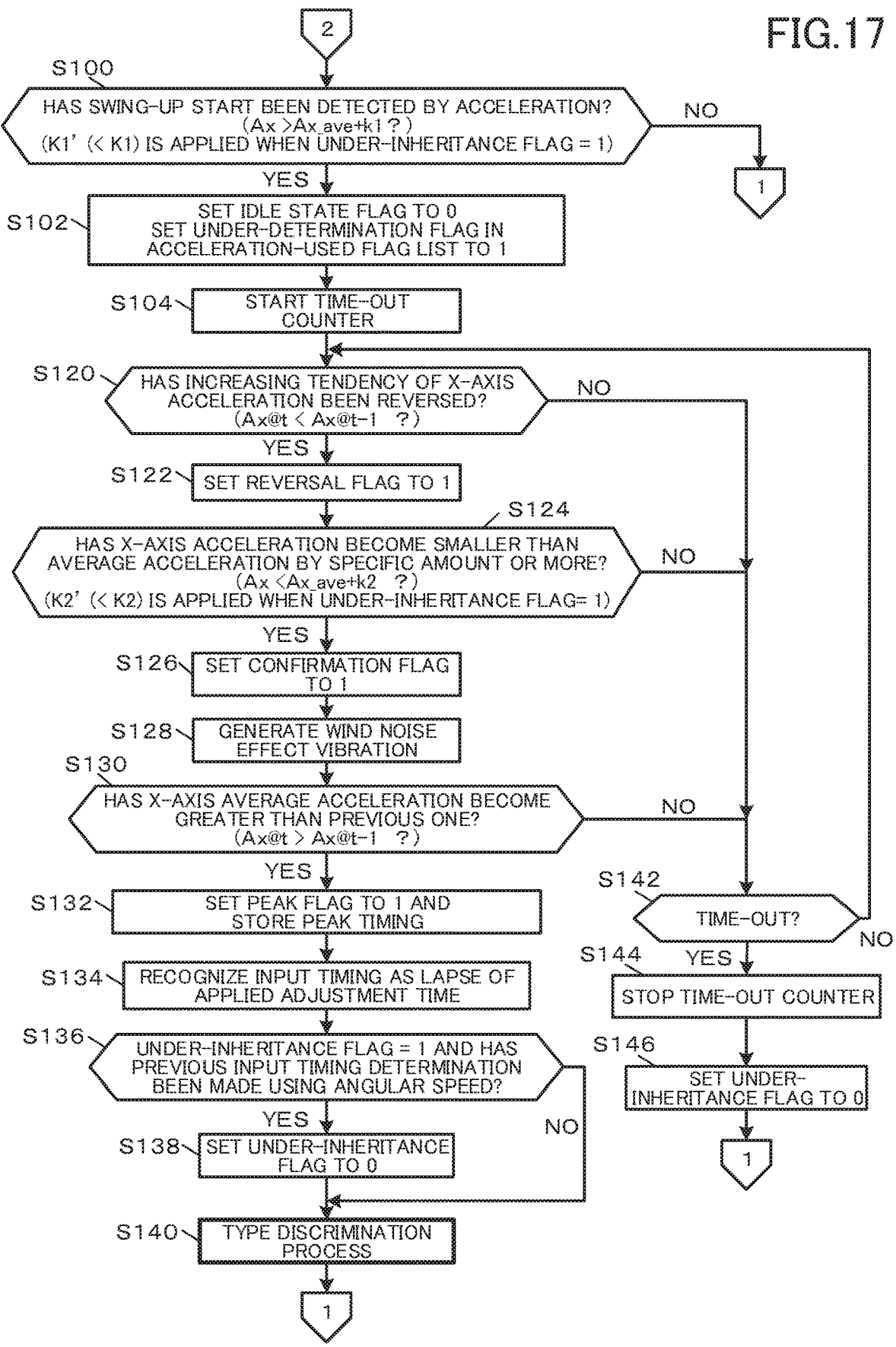
FIG. 17 is a flowchart continued from FIG. 16.

FIGS. 16 and 17 are flowcharts of the input determination process according to the present embodiment. In the process, the game device 1400 first sets the idle state flag 740 to "1" (idle state), and sets all the flags in the angular speed-used flag list 742 and the acceleration-used flag list 744 to "0" (step S28).

Next, when the under-inheritance flag 748 is not set to "1 (under execution of inheritance)" (NO in step S30) and the absolute value of the angular speed ωz around the Z-axis is greater than the swing-up start determination criteria angular speed value 531 (ωm) (YES in step S32), the game device 1400 sets the idle state flag 740 to "0" (non-idle state), and sets the under-determination flag in the angular speed-used flag list 742 to "1" (under determination) (step S34). Then, the game device 1400 starts the time-out counter (step S36).

Next, the game device 1400 waits for detection of a reversal between positive and negative directions of the angular speed ωz around the Z-axis until the time-out counter completely counts up. Upon detection of the reversal (YES in step S50), the game device 1400 determines that the player has shifted from the swing-up action to the swing-down action, and changes the reversal flag of the angular speed-used flag list 742 to "1" (reversed) (step S52).

Then, after the reversal, the game device 1400 waits for the absolute value of the angular speed ωz around the Z-axis to exceed the required momentum determination criteria angular speed value 532 (ωf) until the time-out counter completely counts up. Then, when the required momentum determination criteria angular speed value 532 (ωf) has been exceeded (YES in step S54), the game device 1400 sets the requirement flag in the angular speed-used flag list 742 to "1" (required momentum is reached) (step S56). The game device 1400 generates the wind noise effect vibration (step S57).

Subsequently, after the required momentum has been reached, the game device 1400 further waits for detection of a peak of the angular speed ωz around the Z-axis until the time-out counter completely counts up (step S58). That is, the game device 1400 calculates a temporal change in absolute value Δ|ωz|. When the absolute value becomes negative, the game device 1400 determines that a peak has been detected (YES in step S58), changes the peak flag in the angular speed-used flag list 742 to "1" (peak is detected) and temporarily stores the peak timing 746 (step S60).

Then, the game device 1400 recognizes the input timing with a lapse of the applied adjustment time 702 from the peak timing 746 (see FIG. 14; at this stage, the initial adjustment time 542 is initialized to "0") (step S62).

When the under-inheritance flag 748 is set to "1" and the previous input timing determination has been made using acceleration (YES in step S64), the game device 1400 returns the under-inheritance flag 748 to "0" (step S66) and executes the type discrimination process (step S68).

If there have not occurred the positive-to-negative reversal, the arrival at the required momentum, and the detection of the peak until the time-out counter started after the detection of swing-up start completely counts up (NO in step S70), the game device 1400 stops the time-out counter (step S72), returns the under-inheritance flag 748 to "0" (step S66), and returns to step S28.

On the other hand, when the under-inheritance flag 748 is set to "1" (YES in step S30) and a negative determination is made in step S32 (YES in step S32), the game device 1400 moves to the flow illustrated in FIG. 17.

Focusing on a case where the under-inheritance flag 748 is set to "1", when the measurement value satisfies the inheritance condition, the game device 1400 skips steps S32 to S74. That is, the input determination condition related to angular speed is omitted and the input timing is determined under only the input determination condition related to acceleration. In other words, instead of the input determination condition in a case where the measurement value does not meet the inheritance condition, the input timing is determined based on a second input determination condition that is easier to satisfy than the foregoing input determination condition.

Specifically, when the acceleration Ax along the Xl-axis measured by the triaxial acceleration sensor 1475 has exceeded a first threshold obtained by adding a predetermined swing-up start determination criteria coefficient 533 (k1) to the average acceleration Ax_ave, the game device 1400 determines that the player has started the "swing-up action" (YES in step S100). In step S100, when the under-inheritance flag 748 is set to "1", instead of the swing-up start determination criteria coefficient 533 (k1), a coefficient k1' obtained by decreasing the coefficient k1 at a predetermined ratio is applied.

When determining the start of the swing-up action, the game device 1400 sets the idle state flag 740 to "0" and sets the under-determination flag in the acceleration-used flag list 744 to "1" (step S102). Then, the game device 1400 starts the time-out counter (step S104).

When determining the start of the swing-up action, the game device 1400 compares an acceleration Ax@t along the X-axis lastly measured with an acceleration Ax@t−1 in the previous measurement cycle until the time-out counter completely counts up.

When detecting that the acceleration Ax@t along the X-axis lastly measured has become smaller than the acceleration Ax@t−1 in the previous measurement cycle, that is, when detecting a reversal between the increasing and decreasing tendencies (YES in step S120), the game device 1400 changes the reversal flag in the acceleration-used flag list 744 to "1" (reversal is detected) (step S122).

Subsequently, after the detection of the reversal from the increasing tendency, that is, after the result of the premise determination is in the affirmative, the game device 1400 compares the acceleration Ax along the X-axis with a threshold obtained by adding a confirmed determination criteria coefficient k2 to the average acceleration Ax_ave until the time-out counter completely counts up.

Then, when the acceleration Ax falls under the threshold (YES in step S124), the game device 1400 confirms and determines that the player is intentionally performing the swing-down action, and changes the confirmation flag in the acceleration-used flag list 744 to "1" (swing-down action is conformed) (step S126). Then, the game device 1400 generates the wind noise effect vibration (step S128).

In step S124, when the under-inheritance flag 748 is set to "1", instead of the confirmed determination criteria coefficient k2, a coefficient k2' obtained by decreasing the coefficient k2 at a predetermined ratio is applied.

Next, after the confirmation of the swing-down action, the game device 1400 compares the latest acceleration Ax@t with the acceleration Ax@t−1 in the previous measurement cycle until the time-out counter completely counts up.

When the latest acceleration Ax@t becomes greater than the acceleration Ax@t−1 in the previous measurement cycle (YES in step S130), the game device 1400 detects a peak of measurement value appearing immediately before the stop of the motion and determines that the player has started the damping action, and changes the peak flag in the acceleration-used flag list 744 to "1" (peak is detected) and temporarily stores the peak timing 746 (step S132).

Focusing on a case where the process reaches step S130 when the under-inheritance flag 748 is set to "1", when the measurement value satisfies the inheritance condition, the game device 1400 determines the input timing as the timing at which the second input determination condition based on the first acceleration has been satisfied (YES in step S130) after the magnitude of the first acceleration (the acceleration Ax along the X-axis) after the reversal exceeds a given second threshold (YES in step S124), instead of the input determination condition when the inheritance condition is not satisfied (the under-inheritance flag 748 is set to "0").

Then, the game device 1400 recognizes the input timing with a lapse of the applied adjustment time 702 from the peak timing 746 (see FIG. 14; at this stage, the initial adjustment time 542 is initialized to "0") (step S134). Then, when the under-inheritance flag 748 is set to "1" and the previous input timing determination has been made using angular speed (YES in step S136), the game device 1400 returns the under-inheritance flag 748 to "0" (step S138) and executes the type discrimination process (step S140).

If there have not occurred the reversal from the increasing tendency, the arrival at the required momentum, and the detection of the peak until the time-out counter started after the detection of swing-up start due to the acceleration completely counts up (NO in step S140), the game device 1400 stops the time-out counter (step S144), returns the under-inheritance flag 748 to "0" (step S146), and returns to step S28.

Focusing on a case where the under-inheritance flag 748 is set to "1", when the measurement value satisfies the inheritance condition, the game device 1400 determines the input timing as the timing at which the second input determination condition based on the first acceleration has been satisfied (YES in step S130) after the magnitude of the first acceleration after the reversal exceeds a given second threshold (YES in step S124), instead of the input determination condition when the inheritance condition is not satisfied.

Figure 18:
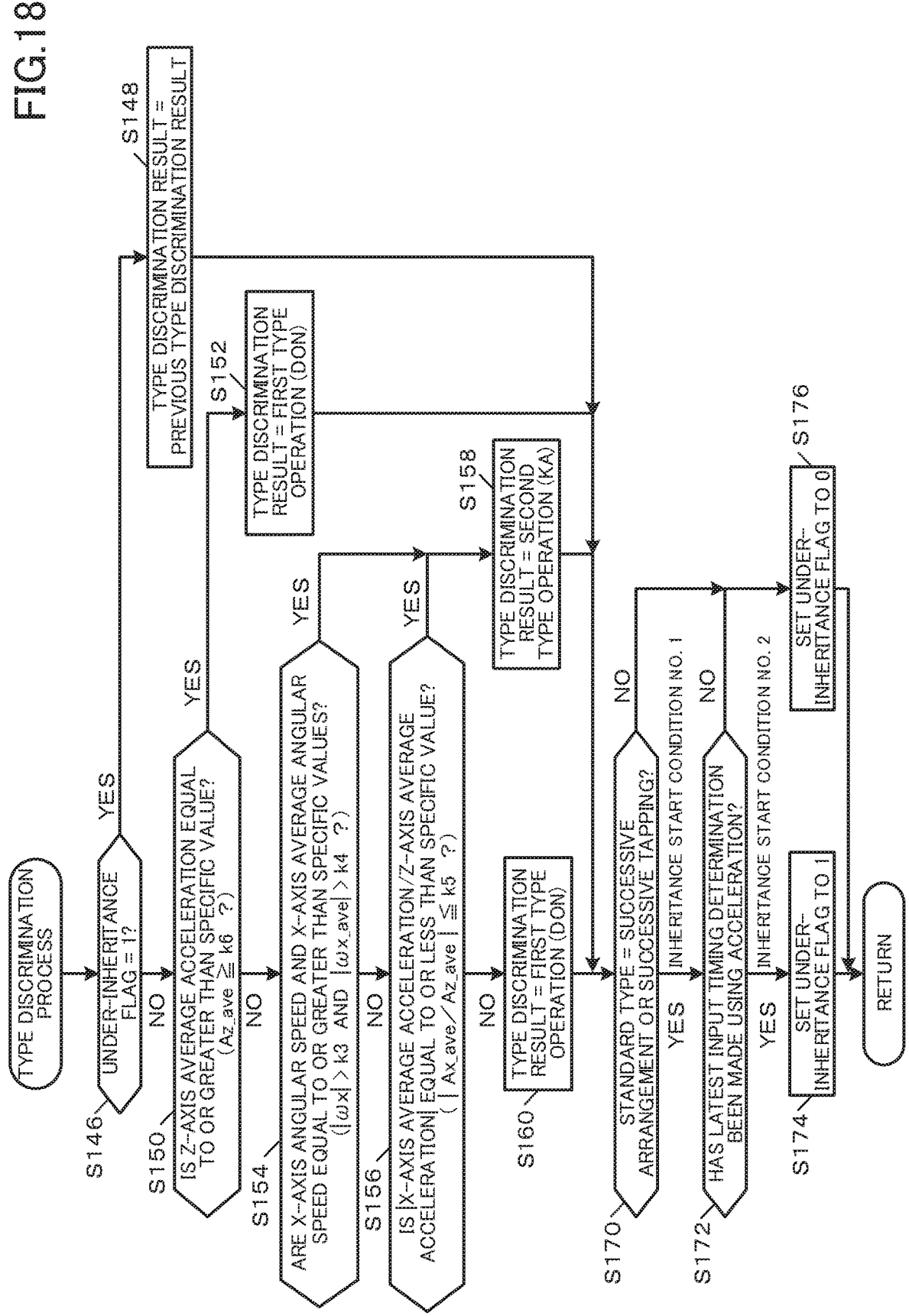
FIG. 18 is a flowchart of a type discrimination process.

FIG. 18 is a flowchart of a type discrimination process according to the present embodiment.

In the process, the game device 1400 first refers to the under-inheritance flag 748. Then, when the flag is set to "1" (YES in step S146), the game device 1400 copies the type discrimination result stored in the latest input determination history data 750 (see FIG. 14) and sets the copy to the current type discrimination result. That is, the game device 1400 inherits the previous type discrimination result (step S148). Then, the game device 1400 terminates the type discrimination process. That is, in a situation where it is considered that the player is performing successive tapping inputs, the process load on type discrimination is significantly reduced.

In the process, the game device 1400 determines whether the action of an operation input determined this time corresponds to the ka-don pattern (see FIG. 9). Specifically, when the average acceleration Az_ave including the acceleration Az along the Z-axis of the peak timing 746 as the latest measurement value has reached the sixth determination criteria value 538 (k6), the game device 1400 determines that the action corresponds to the ka-don pattern (YES in step S150) and sets the result of the type discrimination to the first type operation (don) (step S152).

If the action does not correspond to the ka-don pattern (NO in step S150), the game device 1400 then determines whether the action corresponds to the don-ka pattern (see FIG. 7). Specifically, when the absolute value of the angular speed ωx of the peak timing 746 has exceeded the predetermined third determination criteria value k3 and the absolute value of the average angular speed ωx_ave including the angular speed ωx in the peak timing 746 as the latest measurement value has exceeded the predetermined fourth determination criteria value k4, the game device 1400 determines that the action corresponds to the don-ka pattern (YES in step S154) and sets the result of the type discrimination to the second type operation (ka) (step S158).

If the action corresponds to neither the ka-don pattern nor the don-ka pattern (NO in step S154), the game device 1400 then determines whether the action corresponds to the ka-ka pattern (see FIG. 8). Specifically, when the ratio between the absolute value of the average acceleration Ax_ave including the acceleration Ax of the peak timing 746 as the latest measurement value and the absolute value of the average acceleration Az_ave including the acceleration Az of the peak timing 746 as the latest measurement value is equal to or less than the predetermined fifth determination criteria value k5, the game device 1400 determines that the action corresponds to the ka-ka pattern (YES in step S156) and sets the result of the type discrimination to the second type operation (ka) (step S158).

If the action corresponds to none of the ka-don pattern, the don-ka pattern, and the ka-ka pattern (NO in step S156), the game device 1400 sets the result of the type discrimination to the first type operation (don) (step S160).

When the result of the type discrimination is obtained, the game device 1400 determines whether the standard type to be evaluated corresponds to successive arrangement or successive tapping (step S170), In the present embodiment, referring to the musical note definition data 525 (see FIG. 13), the game device 1400 makes an affirmative determination when a predetermined number of successive requirements or more are successively presented at short time intervals of a predetermined standard value or less before and after the don 25a or the ka 25b that is the standard type to be evaluated. The game device 1400 makes an affirmative determination when the standard types to be evaluated are the successive don 25c and the successive ka 25d (see FIG. 4).

In the case of making an affirmative determination (YES in step S170), when the latest input timing determination has been made using acceleration (YES in step S172), the game device 1400 then determines that the player is performing successive inputs with satisfaction of the inheritance condition, sets the under-inheritance flag 748 to "1" (step S174), and terminates the type discrimination process.

On the other hand, when the standard type to be evaluated does not correspond to the successive arrangement or the successive tapping (NO in step S170) or when the latest input timing determination has been made using angular speed (NO in step S172), the game device 1400 determines that the player is not performing successive tapping, sets the under-inheritance flag 748 to "0" (step S176), and terminates the type discrimination process.

Returning to FIG. 15, in step S14, the execution of the periodic input determination process by each game controller is started to prepare the game controller 1460.

Next, the game device 1400 executes an adjustment time setting process (step S180). That is, the game device 1400 causes the touch panel 1406 to display the adjustment screen W10 (see FIG. 10) so that the player sets the adjustment time so as not to feel a discomfort in an output time difference of a response sound from an operation input. The game device 1400 updates the applied adjustment time 702 by this result.

Then, the game device 1400 accepts a selection of music to be played (play music) (step S182), and starts a game progress control (step S184). Accordingly, the sound of the play music is emitted from the speaker 1410, and in synchronization with this, the game screen W3 (see FIG. 3) is displayed on the touch panel 1406.

The game device 1400 also starts the evaluation of an operation input and the notification control of the evaluation (for example, notification display of the type discrimination result (see FIG. 11)), the response output in accordance with an operation input (for example, the emission of an operation input sound), a vibration control in accordance with an operation input (for example, the wind noise effect vibration (see FIGS. 5 and 6) and the input effect vibration (see FIGS. 5 and 6)), and others. In particular, in the present embodiment, changing the display size of the type notification marker 40 as one of notification displays plays the role of notifying that the operation input substantially satisfying the inheritance condition is being performed (see FIG. 11).

The input determination is already executed so that preparations for operation inputs by the game controller 1460 are made in step S14. The player can play the music game by performing operation inputs by the game controller 1460 in tune with the reference operations at the presented reference timings while listening the play music and watching the musical note 20 on the game screen W3.

At the end of the gameplay (step S186), the game device 1400 displays the play performance (step S188) and terminates the series of processes.

According to the present embodiment described above, it is possible to implement a technique for a game device including a game controller with an acceleration sensor as an inertial sensor and a gyro sensor to, at execution of a game at which the action of swinging and stopping the game controller in the air is regarded as an operation input, determine using measurement values of the inertial sensor that the player has performed an operation input timing at the timing at which he/she feels he/she has performed the operation input.

Further, in the operation input determination when the reference operation requiring successive inputs is presented, when a change in acceleration measured by the inertial sensor of the game controller 1460 appears at successive vertical movement of the controller, the game device 1400 recognizes that the inheritance condition is satisfied and reduces the process load by limiting the operation input determination to determination based on the change in acceleration, and simplifies the process of type discrimination of the operation input through inheritance of the previous discrimination result to further reduce the process load.

Specifically, when YES in step S30 illustrated in FIG. 16, the game device 1400 skips steps S132 to S74 to reduce the process load of the input timing determination, and skips steps S150 to S160 illustrated in FIG. 18 to reduce the process load of the type discrimination process. Therefore, it is possible to avoid a lack of a margin for process load and prevent a decrease in resolution of type discrimination of successive operation inputs in a short time.

Modification Examples

The embodiment to which the present disclosure is applied has been described so far. However, the modes to which the present disclosure is applicable are not limited to the foregoing embodiment but the components can be added, omitted, or changed as appropriate.

For example, a game executable on a stand-alone basis is taken in the foregoing embodiment. However, the present disclosure is not limited to this. Like the game controller 1460 according to the foregoing embodiment, a computer including the triaxial acceleration sensor 1475 and the triaxial gyro sensor 1476 in a controller section can be used as a player terminal so that online games can be played with access to game servers. In that case, the game calculation section 210 (see FIG. 12) according to the embodiment can be implemented by a game server.

The relative relationship between the game controller 1460 and the measurement axes of the sensors included in the game controller 1460 is not limited to the example illustrated in FIG. 2 but can be changed as appropriate.

In the foregoing embodiment, the types of operation inputs are two: the first type operation (don) and the second type operation (ka). However, the present disclosure is not limited to this. For example, the first type operation and the second type operation can have different strength levels of swinging of the game controller. The stages of the strength levels can be set as appropriate. If two stages are provided, the game can have total four types of operation inputs. In this case, it is necessary to prepare four types of indicators that are to be displayed on the musical note 20. In addition, the type discrimination section 230 (see FIG. 12) needs to discriminate the strength level of input motion by comparing the measurement value at the time of input determination, for example, the magnitude of the acceleration or the magnitude of the angular speed in the peak timing 746 with a predetermined threshold. That is, the type discrimination section 230 is caused to serve also as "strength level discrimination section".

In the foregoing embodiment, a music game requiring short latency and quick response is taken as an example. However, the present disclosure is also applicable to games of other genres. For example, the present disclosure is suitable for games where virtual hitting objects appear such as a virtual whack-a-mole game.

Depending on the game content, either the triaxial acceleration sensor 1475 or the triaxial gyro sensor 1476 can be omitted from the game controller 1460 so that the input determination is limited to the input determination based on acceleration or the input determination based on angular speed. In addition, depending on the game content, when the input timing is determined, either response output by sound or response output by display can be omitted.

The foregoing embodiment can be additionally configured to allow the player to select the degree of leniency/severity (stringency) of determination of successive inputs. In other words, the adjustment control section 212 can have an additional function of making the first threshold and the second threshold adjustable based on an operation input of the player.

Figure 19:
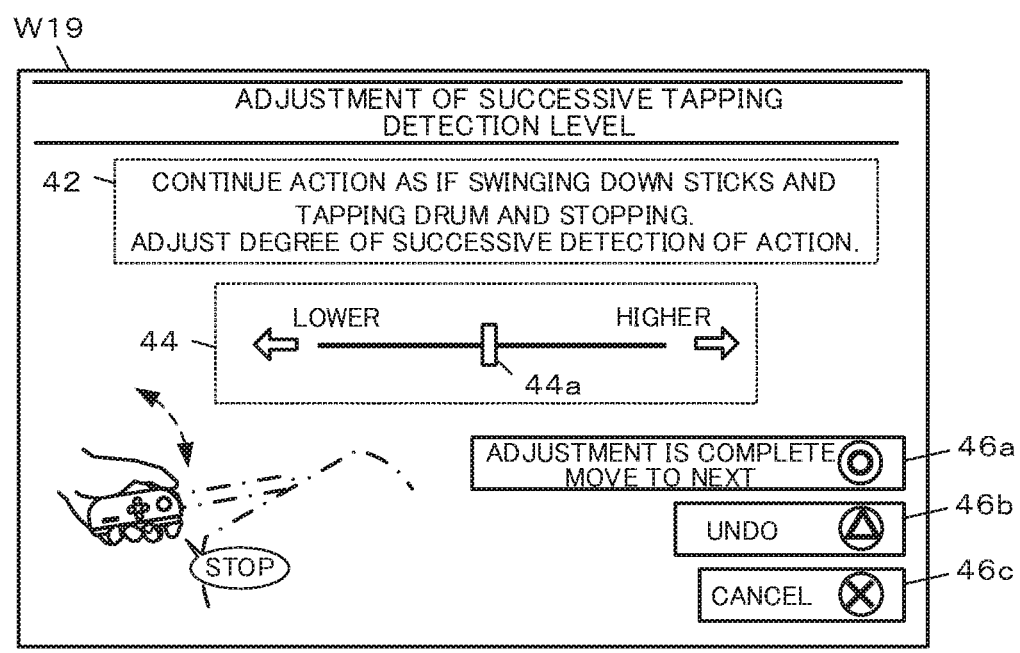
FIG. 19 is a diagram illustrating an example of display on a setting screen that accepts a setting operation of level of successive tapping input determination.

For example, successively from step S180 (see FIG. 15), a setting screen W19 as illustrated in FIG. 19 can be displayed to accept the player's selection of the degree of leniency/severity. The setting screen W19 includes instructions 42 for setting, a setting operation part 44 that accepts an operation of setting the degree of leniency/severity of determination of successive inputs, and operation icons 46 (46a, 46b, . . . ).

Figure 20:
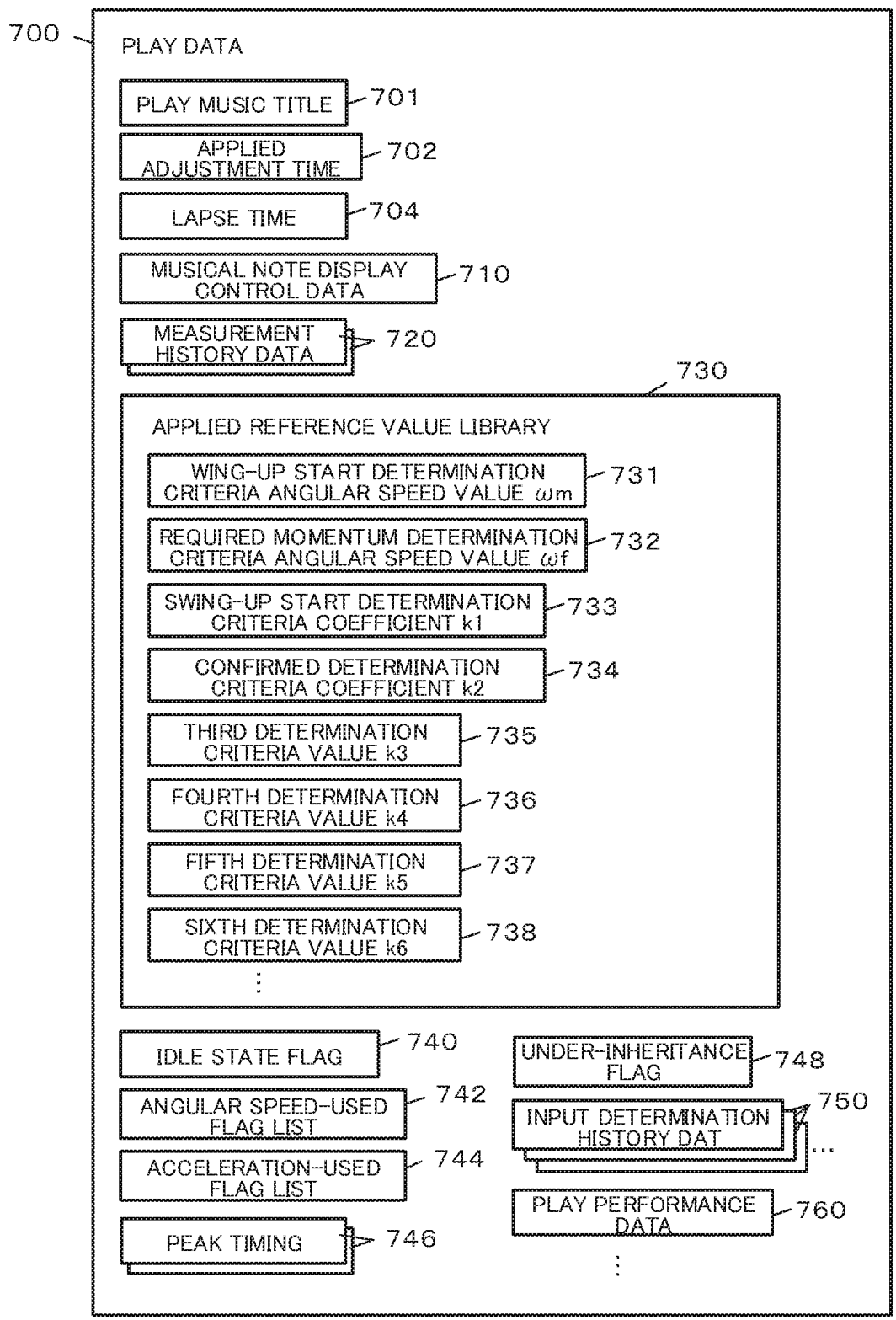
FIG. 20 is a diagram illustrating a data configuration example of play data where a setting operation of level of successive tapping input determination is acceptable.

As illustrated in FIG. 20, the play data 700 is provided with an applied standard value library 730 to store the results of setting at the setting operation part 44. The applied standard value library 730 stores various standard values that are actually applied to input timing determination and type discrimination. Specifically, before the start of the game, the initial standard value library 530 (see FIG. 13) is copied to the applied standard Value library 730 that stores a swing-up start determination criteria angular speed value 731 to a sixth determination criteria value 738. In accordance with the result accepted by the setting operation part 44, among the copied standard values, the swing-up determination criteria coefficient k1 and the confirmed determination criteria coefficient k2 are changed.

Alternatively, a coefficient k1' to be applied instead of the swing-up start determination criteria coefficient 533 (k1) when the under-inheritance flag 748 is set to "1" in step S100 and a coefficient k2' to be applied instead of the confirmed determination criteria coefficient k2 when the under-inheritance flag 748 is set to "1" in step S124 are set as individual data to the initial standard value library 530. Then, these values copied to the applied standard value library 730 may be changed in accordance with the result accepted by the setting operation part 44.

Although only some embodiments of the present disclosure have been described in detail above, those skilled in the art will readily appreciate that many modifications are possible in the embodiments without materially departing from the novel teachings and advantages of this disclosure. Accordingly, all such modifications are intended to be included within scope of this disclosure.

What is claimed is:

1. A computer device comprising:
at least one processor or circuit programmed to perform:
presenting a reference timing and a type of a reference operation to be performed at the reference timing, the reference timing being a timing at which a player is supposed to perform a motion of swinging and stopping a controller containing an inertial sensor;
determining an input timing by detecting that a measurement value of the inertial sensor has satisfied a given input determination condition; and
discriminating a type of an operation input at the input timing based on the measurement value, wherein
the discriminating the type of the operation input includes inheriting the type of an operation input previously discriminated when the measurement value satisfies a given inheritance condition,
wherein
the controller has a plurality of operation buttons arranged on a front side and has a longitudinal shape that is capable of being gripped and held by one hand,
the inertial sensor measures at least a first acceleration along a first axis in a direction orthogonal to a longitudinal direction of the controller and a front normal direction of the controller, and
the inheritance condition includes at least a condition based on the first acceleration,
wherein the inheritance condition includes at least a condition that, after magnitude of the first acceleration exceeds a given first threshold, increasing and decreasing tendencies of the first acceleration are reversed, and the magnitude of the first acceleration after the reversal exceeds a given second threshold.

2. The computer device as defined in claim 1, wherein the inheritance condition includes at least a condition that same type of the successive reference operations are presented.

3. The computer device as defined in claim 1, wherein
the presenting includes presenting the reference timing as an instantaneous timing or a time range, and
the inheritance condition includes at least a condition that the reference timing is presented as the time range.

4. The computer device as defined in claim 1, wherein
the inertial sensor measures, besides the first acceleration, a three-dimensional acceleration by measuring an acceleration in the longitudinal direction of the controller and an acceleration in the front normal direction of the controller,
the first threshold is a threshold based on an average of magnitudes of the three-dimensional acceleration for a predetermined past time, and
the second threshold is a threshold based on an average of magnitudes of the three-dimensional acceleration for a predetermined past time.

5. The computer device as defined in claim 1, comprising at least one processor or circuit further programmed to perform adjusting the first threshold and/or the second threshold based on an operation input of the player.

6. The computer device as defined in claim 1, wherein determining the input timing includes determining the input timing based on, instead of the input determination condition, a second input determination condition that is easier to satisfy than the input determination condition when the measurement value satisfies the inheritance condition.

7. The computer device as defined in claim 1, wherein the determining the input timing includes determining a timing at which, instead of the input determination condition, a third input determination condition based on the first acceleration is satisfied as the input timing when the measurement value satisfies the inheritance condition.

8. The computer device as defined in claim 7, wherein the third input determination condition is a condition that the magnitudes of the first acceleration for a predetermined past time show a decreasing tendency.

9. The computer device as defined in claim 1, comprising at least one processor or circuit further programmed to perform notifying that an operation input satisfying the inheritance condition is being performed.

10. A computer device comprising:
at least one processor or circuit programmed to perform:
presenting a reference timing and a type of a reference operation to be performed at the reference timing, the reference timing being a timing at which a player is supposed to perform a motion of swinging and stopping a controller containing an inertial sensor;
determining an input timing by detecting that a measurement value of the inertial sensor has satisfied a given input determination condition; and
discriminating a type of an operation input at the input timing based on the measurement value, wherein
the discriminating the type of the operation input includes inheriting the type of an operation input previously discriminated when the measurement value satisfies a given inheritance condition,
wherein
the controller has a plurality of operation buttons arranged on a front side and has a longitudinal shape that is capable of being gripped and held by one hand,
the inertial sensor measures at least a first acceleration along a first axis in a direction orthogonal to a longitudinal direction of the controller and a front normal direction of the controller, and
the inheritance condition includes at least a condition based on the first acceleration,
wherein the determining the input timing includes determining a timing at which, instead of the input determination condition, a third input determination condition based on the first acceleration is satisfied as the input timing when the measurement value satisfies the inheritance condition.

11. The computer device as defined in claim 10, wherein the third input determination condition is a condition that the magnitudes of the first acceleration for a predetermined past time show a decreasing tendency.

12. An evaluation control method executed by a computer device, the method comprising:
presenting a reference timing and a type of a reference operation to be performed at the reference timing, the reference timing being a timing at which a player is supposed to perform a motion of swinging and stopping a controller containing an inertial sensor;
determining an input timing by detecting that a measurement value of the inertial sensor has satisfied a given input determination condition; and
discriminating a type of an operation input at the input timing based on the measurement value, wherein
the discriminating the type of the operation input includes inheriting the type of an operation input previously discriminated when the measurement value satisfies a given inheritance condition,
wherein
the controller has a plurality of operation buttons arranged on a front side and has a longitudinal shape that is capable of being gripped and held by one hand,
the inertial sensor measures at least a first acceleration along a first axis in a direction orthogonal to a longitudinal direction of the controller and a front normal direction of the controller, and
the inheritance condition includes at least a condition based on the first acceleration,
wherein the inheritance condition includes at least a condition that, after magnitude of the first acceleration exceeds a given first threshold, increasing and decreasing tendencies of the first acceleration are reversed, and the magnitude of the first acceleration after the reversal exceeds a given second threshold.

13. The evaluation control method as defined in claim 12, wherein the inheritance condition includes at least a condition that same type of the successive reference operations are presented.

14. The evaluation control method as defined in claim 12, wherein
the presenting includes presenting the reference timing as an instantaneous timing or a time range, and
the inheritance condition includes at least a condition that the reference timing is presented as the time range.

15. The evaluation control method as defined in claim 12, wherein
the inertial sensor measures, besides the first acceleration, a three-dimensional acceleration by measuring an acceleration in the longitudinal direction of the controller and an acceleration in the front normal direction of the controller,
the first threshold is a threshold based on an average of magnitudes of the three-dimensional acceleration for a predetermined past time, and
the second threshold is a threshold based on an average of magnitudes of the three-dimensional acceleration for a predetermined past time.

16. The evaluation control method as defined in claim 12, further comprising adjusting the first threshold and/or the second threshold based on an operation input of the player.

17. The evaluation control method as defined in claim 12, wherein determining the input timing includes determining the input timing based on, instead of the input determination condition, a second input determination condition that is easier to satisfy than the input determination condition when the measurement value satisfies the inheritance condition.

18. An evaluation control method executed by a computer device, the method comprising:
presenting a reference timing and a type of a reference operation to be performed at the reference timing, the reference timing being a timing at which a player is supposed to perform a motion of swinging and stopping a controller containing an inertial sensor;
determining an input timing by detecting that a measurement value of the inertial sensor has satisfied a given input determination condition; and
discriminating a type of an operation input at the input timing based on the measurement value, wherein
the discriminating the type of the operation input includes inheriting the type of an operation input previously discriminated when the measurement value satisfies a given inheritance condition,
wherein
the controller has a plurality of operation buttons arranged on a front side and has a longitudinal shape that is capable of being gripped and held by one hand,
the inertial sensor measures at least a first acceleration along a first axis in a direction orthogonal to a longitudinal direction of the controller and a front normal direction of the controller, and
the inheritance condition includes at least a condition based on the first acceleration,
wherein the determining the input timing includes determining a timing at which, instead of the input determination condition, a third input determination condition based on the first acceleration is satisfied as the input timing when the measurement value satisfies the inheritance condition.

19. A computer device comprising:
at least one processor or circuit programmed to perform:
presenting, to a player, a reference timing and a type of a reference operation to be performed at the reference timing, the reference timing being a timing at which a player is supposed to perform a motion of swinging and stopping a controller containing an inertial sensor, the motion corresponding to a player operation that simulates tapping a virtual body to simulate a sound effect;
determining an input timing by detecting that a measurement value of the inertial sensor has satisfied a given input determination condition; and discriminating a type of an operation input at the input timing based on the measurement value, wherein the discriminating the type of the operation input includes inheriting the type of an operation input previously discriminated when the measurement value satisfies a given inheritance condition.

20. An evaluation control method executed by a computer device, the method comprising:

presenting, to a player, a reference timing and a type of a reference operation to be performed at the reference timing, the reference timing being a timing at which a player is supposed to perform a motion of swinging and stopping a controller containing an inertial sensor, the motion corresponding to a player operation that simulates tapping a virtual body to simulate a sound effect;

determining an input timing by detecting that a measurement value of the inertial sensor has satisfied a given input determination condition; and discriminating a type of an operation input at the input timing based on the measurement value, wherein the discriminating the type of the operation input includes inheriting the type of an operation input previously discriminated when the measurement value satisfies a given inheritance condition.

\* \* \* \* \*